United States Patent
Wuehler et al.

(10) Patent No.: US 10,951,476 B1
(45) Date of Patent: Mar. 16, 2021

(54) METHODS AND APPARATUS FOR DYNAMIC NETWORK CLASSIFICATION USING AUTHENTICATED NEIGHBOR DETECTION

(71) Applicant: McAfee, LLC, Santa Clara, CA (US)

(72) Inventors: Eric D. Wuehler, Hillsboro, OR (US); Jonathan B. King, Hillsboro, OR (US); Arthur S. Zeigler, Hillsboro, OR (US)

(73) Assignee: MCAFEE, LLC, San Jose, CA (US)

( * ) Notice: Subject to any disclaimer, the term of this patent is extended or adjusted under 35 U.S.C. 154(b) by 0 days.

(21) Appl. No.: 16/567,872

(22) Filed: Sep. 11, 2019

(51) Int. Cl.
| | | |
|---|---|---|
| *G06F 15/16* | (2006.01) | |
| *H04L 12/24* | (2006.01) | |
| *G06F 9/451* | (2018.01) | |
| *H04L 12/26* | (2006.01) | |
| *H04L 29/08* | (2006.01) | |
| *H04L 29/06* | (2006.01) | |

(52) U.S. Cl.
CPC .......... *H04L 41/0866* (2013.01); *G06F 9/451* (2018.02); *H04L 43/16* (2013.01); *H04L 63/0421* (2013.01); *H04L 67/12* (2013.01)

(58) Field of Classification Search
CPC .................................................. H04L 41/0866
USPC ........................................................ 709/220
See application file for complete search history.

(56) References Cited

U.S. PATENT DOCUMENTS

| | | | | |
|---|---|---|---|---|
| 8,838,759 B1 * | 9/2014 | Eatough | ................ | H04L 41/085 709/223 |
| 9,832,221 B1 * | 11/2017 | Newstadt | .............. | G06F 21/316 |
| 2002/0032780 A1 * | 3/2002 | Moore | ..................... | H04L 69/32 709/228 |
| 2003/0014548 A1 * | 1/2003 | Valentine | ............. | H04Q 3/0083 709/252 |
| 2005/0066020 A1 * | 3/2005 | Wechter | .................. | H04L 41/12 709/223 |
| 2007/0005738 A1 * | 1/2007 | Alexion-Tiernan | .... | H04L 41/12 709/223 |
| 2008/0304427 A1 * | 12/2008 | Biswas | ................... | H04L 41/22 370/255 |
| 2009/0154354 A1 * | 6/2009 | Kwan | ..................... | H04L 47/11 370/235 |
| 2010/0158109 A1 * | 6/2010 | Dahlby | .............. | H04N 21/8173 375/240.03 |
| 2010/0223375 A1 * | 9/2010 | Dehaan | ............... | H04L 41/0853 709/224 |

(Continued)

*Primary Examiner* — Hamza N Algibhah
(74) *Attorney, Agent, or Firm* — Hanley, Flight & Zimmerman, LLC

(57) ABSTRACT

Methods, apparatus, systems, and articles of manufacture are disclosed for dynamic network classification using authenticated neighbor detection. An example includes a network comparator to determine whether a network to be connected by a computing device is a managed network based on network configuration information associated with the network, in response to determining the network is not a managed network, a neighbor comparator to determine a number of different computing devices on the network that are managed computing devices, and in response to determining that the number of the managed computing devices satisfies a threshold, a sensor controller to invoke a sensor of the computing device to obtain data from computing devices associated with the network, the computing devices including the managed computing devices.

42 Claims, 11 Drawing Sheets

(56) References Cited

U.S. PATENT DOCUMENTS

| | | | | |
|---|---|---|---|---|
| 2011/0271319 | A1* | 11/2011 | Venable, Sr. | H04L 41/12 |
| | | | | 726/1 |
| 2014/0012983 | A1* | 1/2014 | Brown | H04L 43/0817 |
| | | | | 709/224 |
| 2014/0029617 | A1* | 1/2014 | Wang | H04L 47/10 |
| | | | | 370/392 |
| 2015/0124790 | A1* | 5/2015 | Seine | H04W 24/02 |
| | | | | 370/338 |
| 2015/0149624 | A1* | 5/2015 | Hindawi | H04L 41/0893 |
| | | | | 709/224 |
| 2015/0304920 | A1* | 10/2015 | Cootey | H04W 36/08 |
| | | | | 455/436 |
| 2015/0341234 | A1* | 11/2015 | Yeh | H04L 41/0853 |
| | | | | 709/224 |
| 2017/0270437 | A1* | 9/2017 | Johnstone | G06F 11/3072 |
| 2017/0272336 | A1* | 9/2017 | Johnstone | H04L 43/04 |
| 2018/0048534 | A1* | 2/2018 | Banga | G06N 20/00 |
| 2018/0321969 | A1* | 11/2018 | Bansal | G06F 9/5061 |
| 2019/0028369 | A1* | 1/2019 | Wiener | H04L 41/0853 |
| 2019/0312888 | A1* | 10/2019 | Grimm | H04L 63/02 |
| 2020/0007642 | A1* | 1/2020 | Freilich | H04L 67/1089 |
| 2020/0153863 | A1* | 5/2020 | Wiener | H04L 63/1433 |

* cited by examiner

METHODS AND APPARATUS FOR DYNAMIC NETWORK CLASSIFICATION USING AUTHENTICATED NEIGHBOR DETECTION

FIELD OF THE DISCLOSURE

This disclosure relates generally to computer network classification and, more particularly, to methods and apparatus for dynamic network classification using authenticated neighbor detection.

BACKGROUND

Network administrators collect data from and provide software updates to managed computing devices on a managed computer network. Network administrators can use a device detection product (DDP) to identify rogue or unknown devices accessing the managed computer network. By detecting a rogue device, network administrators can mitigate potential exploits by the rogue device on the managed computer network.

Figure 1:
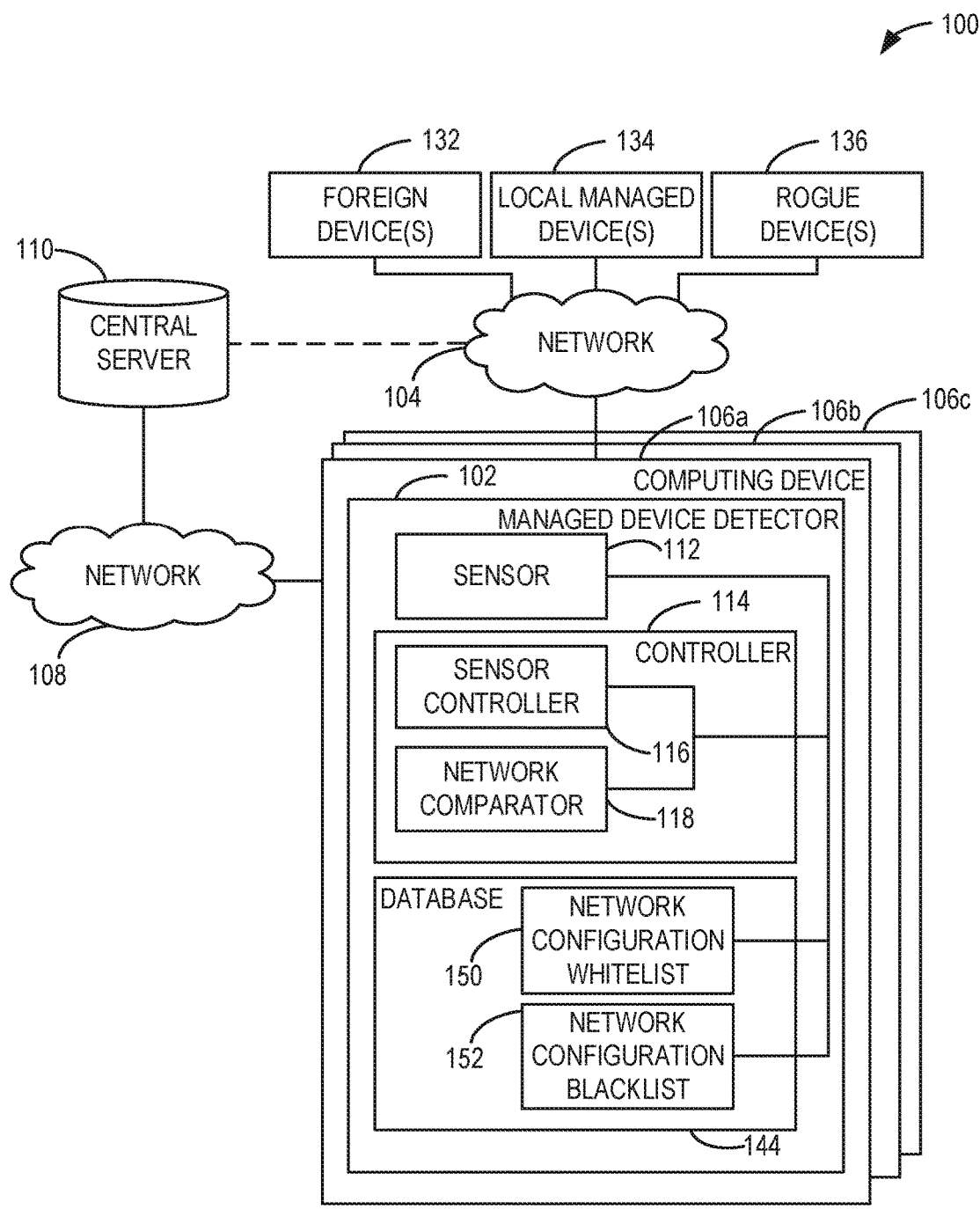
FIG. 1 depicts an example network classification system including an example managed device detector to classify an example network.

The figures are not to scale. In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Device detection products (DDPs) can be used on a managed network overseen and/or otherwise controlled by an administrator (e.g., a network administrator, an infrastructure technology (IT) manager, etc.) or equivalent entity and/or user to detect devices (e.g., computing devices) connected to the managed network. As used herein, a managed network can refer to a computer network (e.g., a known computer network) where an enterprise (e.g., a company, a corporation, a business organization, etc.) has control over (1) the operation and corresponding properties of the computer network and/or (2) a substantial portion of the computing devices connected to the computer network (e.g., Company A's Wi-Fi network). Alternatively, unmanaged networks can refer to computer networks (e.g., unknown computer networks) where an enterprise has control over a specified device but does not have control over the computer network (e.g., Company B's Wi-Fi network from the perspective of Company A, where Company A and B are not affiliated with each other). For example, a network considered to be a managed network (e.g., a known managed network) for one device may be considered an unmanaged network (e.g., an unknown managed network) by a different device (e.g., devices from Company A consider Company A's Wi-Fi network a managed network while devices from Company B consider Company A's Wi-Fi network an unmanaged network).

In some instances, DDP can be used to provide an administrator with a visual interface of all of the computing devices connected to the managed network. DDP can update the visual interface as additional devices connect to or disconnect from the managed network. The visual interface of devices connected to the network can provide information to the administrator about the connected devices. The visual interface can identify devices that are managed by the network (e.g., devices managed and/or otherwise controlled by the administrator) and devices that are unknown to the network (e.g., foreign devices, rogue devices, etc.). Devices that are unknown to the network can execute malicious actions that could harm, disrupt, and/or otherwise disable the one or more of the managed devices connected to the managed network and/or, more generally, the managed network.

A managed device, such as a laptop computer, a smart phone, a tablet, etc., that is affiliated with an enterprise and configured for use on an enterprise or managed network (e.g., a known managed network) can be used outside of the enterprise and the corresponding enterprise network. For example, the managed device may connect to a different network, such as an unmanaged network, a non-enterprise network, etc., where the different network is not managed by an administrator associated with the enterprise. The managed device may include a sensor that, in response to the managed device connecting to the different network, can begin scanning the different network and obtain data from local devices communicatively coupled to the different network. As used herein, a local device can correspond to a different device from the managed device that is connected to the network.

In some instances, the managed device may inadvertently breach a term of service associated with the unmanaged network. For example, the unmanaged network may correspond to a publicly accessible Wi-Fi network that requires accepting a term of service to use. An example term of service may prohibit collecting data associated with connected devices to the publicly accessible Wi-Fi network. The sensor of the managed device may collect information associated with the local devices that are not affiliated with the enterprise, where users of the local devices have not consented to the data collection.

Examples disclosed herein include an example managed device detector to control operation of a network sensor based on a classification of a network using authenticated neighbor detection. In some disclosed examples, the managed device detector is included in a device (e.g., an enterprise device, a managed device, etc.) that connects to a network. The example managed device detector can classify and/or otherwise identify a type or managed state of the network by classifying local devices connected to the network. For example, the managed device detector can classify a device by transmitting a discovery packet (e.g., a discover packet, a data packet, a wireless communication data packet, a discover signal packet, a discovery signal packet, etc.) to the network and analyzing a response to the discovery packet by the computing device. In some disclosed examples, the managed device detector can configure the network sensor associated with the device that is communicatively coupled to the network to dynamically collect data from different devices associated with the network based on determining a network type and/or a managed state of the network.

In some disclosed examples, the managed device detector queries the local devices connected to the network and records a total number of local devices connected to the network, a total number of local devices that respond to the managed device detector with a response indicative of being a managed device affiliated with the enterprise, etc., and/or a combination thereof. For example, the managed device detector can compare a number of the responses from the computing devices to one or more thresholds that can invoke the managed device detector to determine whether to adjust an operating mode and/or, more generally, the operation of the sensor. For example, in response to the number of responses not satisfying a first threshold number of responses (e.g., a minimum threshold number of responses) or a second threshold number of responses (e.g., a maximum threshold number of responses), where the first threshold number of responses is less than the second threshold number of responses, the managed device detector can adjust an operating mode of the sensor from a discovery mode to a passive mode until the computing device connects to a new or different network. In other examples, in response to the number of responses satisfying the first threshold and the second threshold, the managed device detector can adjust an operating mode of the sensor from a discovery mode to an active mode.

In some disclosed examples, in response to the number of responses satisfying the first threshold but not satisfying the second threshold, the managed device detector can anonymize data associated with the responses and transmit the anonymized data to an example central server. In such disclosed examples, the central server can analyze the anonymized data to classify the network and determine an operating mode of the sensor. In some disclosed examples, the managed device detector can use data associated with a response from a user of the managed device detector to determine a location of the corresponding computing device and an operating mode of the sensor. In some disclosed examples, the central server analyzes the anonymized data to modify the first and the second thresholds.

In some disclosed examples, the managed device detector determines that the network is an enterprise network based on a configuration of the network. The example managed device detector can determine that the network is the enterprise network by determining a chain of routing information associated with a routing policy of the network. For example, the managed device detector may classify the network as an enterprise network in response to identifying an enterprise computing device in the chain of routing information, where the enterprise computing device can be a server, a gateway, or other network apparatus having a known affiliation to the enterprise.

FIG. 1 depicts an example network classification system 100 including an example managed device detector 102 to classify a first example network 104. In the illustrated example of FIG. 1, the network classification system 100 includes example computing devices 106a-c. In FIG. 1, the computing devices 106a-c are laptop computers. Alternatively, one or more may be a different type of computing device, such as a smart phone, a tablet computer, a desktop computer, or any other type of computing device. In FIG. 1, each of the computing devices 106a-c includes the managed device detector 102. Alternatively, one or more of the computing devices 106a-c may not include the managed device detector 102. In FIG. 1, the computing devices 106a-c are communicatively coupled to the first network 104 and a second example network 108.

In the illustrated example of FIG. 1, each of the computing devices 106a-c includes the managed device detector 102 to classify a type (e.g., a network type) of the first network 104. In some examples, only one instance of the managed device detector 102 is active while the other instances of the managed device detector 102 are inactive. For example, the computing devices 106a-c may perform a negotiation process in coordination with each other to identify which one of the computing devices 106a-c is to activate a corresponding managed device detector 102. In some examples, the managed device detector 102 transmits data (e.g., device behavior data, local device behavior data, etc.) to an example central server 110 via the second network 108.

In the illustrated example of FIG. 1, the managed device detector 102 includes an example sensor 112 and an example controller 114 to control and/or otherwise facilitate operation of the sensor 112. In some examples, the controller 114 adjusts, configures, and/or otherwise sets a mode (e.g., a sensor mode) of the sensor 112. In some examples, the controller 114 adjusts, configures, and/or otherwise sets one or more configuration parameters of the sensor 112 including an Internet Protocol (IP) address, a subnet mask, an IP port, etc., associated with the sensor 112 and/or, more generally, a network interface associated with the sensor 112. The controller 114 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)).

In the illustrated example of FIG. 1, the managed device detector 102 includes the sensor 112 to interact with devices connected to the network 104 and/or, more generally, the network 104. For example, the sensor 112 may detect devices communicatively coupled to the first network 104. In FIG. 1, the sensor 112 is a network sensor and/or, more generally, a network interface. For example, the sensor 112 can be a transmitter, a receiver, a transceiver, and/or a network interface to facilitate exchange of data with external machines (e.g., computing devices of any kind) via the first network 104 and/or the second network 108. In such examples, the sensor 112 can be implemented by one or more analog or digital circuit(s), logic circuits, programmable processor(s), programmable controller(s), ASIC(s), PLD(s), and/or FPLD(s).

In some examples, the sensor 112 scans network configuration information associated with the first network 104. For example, the network configuration information may include the IP address, a subnet mask, an IP port range, etc., of the first network 104, a name (e.g., a Service Set Identifier (SSID)) of the first network 104, etc. In other examples, the sensor 112 can identify a type of encryption and/or security protocol (e.g., Wired Equivalent Privacy (WEP), Wi-Fi Protected Access (WPA), WPA2, etc.) associated with the first network 104.

In the illustrated example of FIG. 1, the sensor 112 can operate in an active, passive, or discovery mode. In some examples, the sensor 112 scans local device behavior data (e.g., user device behavior data, user behavior associated with a local device, etc.) of devices connected to the first network 104 (e.g., one or more computing devices, all of the computing devices, etc., connected to the first network 104) when operating in the active mode. For example, the sensor 112 may obtain local device behavior data including programs (e.g., computer applications, machine executable scripts, binary files, executable files, etc.) and/or versions of the programs installed on the computing device(s), activity of a user (e.g., local device behavior data) on the computing device (e.g., active applications and/or programs, web browser history, Internet cookies, Web browser certificates, Public key certificates, etc.), etc. In some examples, when in the active mode, the sensor 112 transmits the network configuration information and/or the local device behavior data to an example central server 110 via the second network 108.

In some examples, the sensor 112 waits and/or otherwise operates in a low-power or an inactive state until the managed device detector 102 connects to a different network than the first network 104 when operating in the passive mode. For example, the sensor 112 may identify the IP address of the different network and determine whether the IP address has changed from the IP address of the first network 104.

In some examples, the sensor 112 identifies the routing configuration information of the first network 104 when operating in the discovery mode. For example, the sensor 112 may generate and transmit a request to a network interface (e.g., a modem, a gateway, a wireless access point, etc.) associated with the first network 104 to determine one or more active network routes, persistent routes, etc., and/or a combination thereof implemented and/or otherwise facilitated by the first network 104. In other examples, the sensor 112 can obtain a routing table from a modem, a gateway, a wireless access point, and/or, more generally, a network interface associated with the first network 104. For example, the sensor 112 can obtain destination IP addresses, netmask IP addresses, subnet mask IP addresses, IP ports, gateway IP addresses, a status of one or more gateways, network interface IP addresses, etc. In other examples, the sensor 112 can execute a script (e.g., machine readable instructions) to determine routing configuration information. For example, the script can correspond to executing the "ifconfig" and/or "route" commands in Linux distributions, Microsoft® Windows® operating systems, etc.

In the illustrated example of FIG. 1, the controller 114 includes an example sensor controller 116 to control and/or otherwise facilitate operation of the sensor 112. In some examples, the sensor controller 116 determines the sensor mode based on (1) a device classification (e.g., a foreign device classification, a rogue device classification, a local managed device classification, etc.) of computing or network neighbors (e.g., devices communicatively coupled to the same network as the computing devices 106*a-c*) associated with the first network 104 based on a response to a discovery packet and/or (2) a network classification (e.g., a managed network classification, an unmanaged network classification, etc.) of the first network 104 based on network configuration information. For example, the sensor controller 116 may classify a device connected to the first network 104 as a foreign device, a local managed device, or a rogue device.

In some examples, the sensor controller 116 can be implemented by one or more analog or digital circuit(s), logic circuits, programmable processor(s), programmable controller(s), GPU(s), DSP(s), ASIC(s), PLD(s), and/or FPLD(s). In some examples, the sensor controller 116 implements means for invoking the sensor 112 of the computing devices 106*a-c* (e.g., or the computing devices 206*a-c* as described below in connection with FIG. 2) to obtain data from the managed computing devices.

In some examples, the sensor controller 116 sets a mode of the sensor 112 to the discovery, active, or passive mode. For example, the sensor controller 116 can set the sensor 112 to the discovery mode in response to the computing device 106*a-c* connecting to a network (e.g., the first network 104) for the first time. In other examples, the sensor controller 116 can set the sensor 112 to the active mode in response to an example network comparator 118 determining that the network configuration information of the first network 104 matches network configuration information in an example network configuration whitelist 150. In yet other examples, the sensor controller 116 can set the sensor 112 to the passive mode in response to the network comparator 118 determining that the network configuration information of the first network 104 matches network configuration information in an example network configuration blacklist 152.

In the illustrated example of FIG. 1, the controller 114 includes the network comparator 118 to compare network configuration information associated with the first network 104 to the network configuration whitelist 150 and the network configuration blacklist 152. In some examples, the network configuration whitelist 150 includes a list of network configuration information identifying networks that permit the sensor 112 to operate in the active mode. For example, the network comparator 118 can compare network configuration information of the first network 104 such as an IP address, a subnet mask, an SSID, etc., to a whitelist IP address, a whitelist subnet mask, a whitelist SSID, etc., included in the network configuration whitelist 150. In such examples, when the network configuration whitelist 150 includes one or more portions of the network configuration information of the first network 104, the sensor controller 116 can set the sensor 112 to the active mode. The network comparator 118 can be implemented by one or more analog or digital circuit(s), logic circuits, programmable processor(s), programmable controller(s), GPU(s), DSP(s), ASIC(s), PLD(s), and/or FPLD(s).

In some examples, the network comparator 118 compares the network configuration information associated with the first network 104 to the network configuration blacklist 152. In some examples, the network configuration blacklist 152 includes a list of network configuration information indicative of networks that, when connected to, the sensor 112 should not operate in the active mode. For example, the network comparator 118 can compare network configuration information of the first network 104 such as an IP address, a subnet mask, an SSID, etc., to a blacklist IP address, a blacklist subnet mask, a blacklist SSID, etc., included in the network configuration blacklist 152. In such examples, when the network configuration blacklist 152 includes one or more portions of the network configuration information of the first network 104, the sensor controller 116 can set the sensor 112 to the passive mode.

In some examples, the network comparator 118 classifies the first network 104 as an enterprise network in response to the network comparator 118 determining that the network configuration whitelist 150 includes and/or otherwise corresponds to the network configuration information of the first network 104. In response to classifying the first network 104 as an enterprise network, the network comparator 118 can invoke the sensor controller 116 to set the sensor 112 to the active mode. In other examples, the network comparator 118 can instruct the sensor 112 to adjust operation to the active mode.

In some examples, the network comparator 118 classifies the network 104 as an unmanaged network in response to the network comparator 118 determining that the network configuration blacklist 152 includes the network configuration information of the first network 104. For example, the network comparator 118 may determine that the first network 104 is affiliated with a known public Wi-Fi network or a different enterprise than the enterprise corresponding to the computing devices 106*a-c* because the network information of the first network 104 is included in the network configuration blacklist 152. In response to classifying the network 104 as an unmanaged network, the network comparator 118 can invoke the sensor controller 116 to set the sensor 112 to the passive mode. In other examples, the network comparator 118 can instruct the sensor 112 to adjust operation to the passive mode.

In some examples, the sensor controller 116 sets the sensor 112 to the discovery mode when the network comparator 118 does not associate the network configuration information of the first network 104 with network configuration information included in at least one of the network configuration whitelist 150 or the network configuration blacklist 152. In some examples, the sensor controller 116 sets the sensor 112 to the discovery mode when connected to a different network. In other examples, the network comparator 118 can instruct the sensor 112 to adjust operation to the discovery mode.

In the illustrated example of FIG. 1, the network classification system 100 includes devices connected to the first network 104, such as example foreign device(s) 132, example local managed device(s) 134, and example rogue device(s) 136. For example, the foreign device(s) 132 can correspond to one or more computing devices that include the sensor 112 that is affiliated with an enterprise different than the enterprise affiliated with the sensor 112 of the managed device detector 102. In other examples, the local managed device(s) 134 can correspond to one or more neighbors (e.g., network neighbors) or computing devices that are affiliated with the same enterprise as the sensor 112 of the managed device detector 102. In yet other examples, the rogue device(s) 136 can correspond to one or more computing devices that do not include the sensor 112 or other network sensors and are not affiliated with an enterprise.

In some examples, when in the active mode, the sensor 112 collects local device behavior data from the foreign device(s) 132, local managed device(s) 134, and/or the rogue device(s) 136. In some examples, an administrator of the enterprise associated with the managed device detector 102 adds the foreign device(s) 132 and/or the rogue device(s) 136 to a list of enterprise managed device(s). In such examples, the foreign device(s) 132 and/or the rogue device(s) 136 can transition to and/or otherwise become local managed device(s) 134. In some examples, an administrator blocks the foreign device(s) 132 and/or the rogue device(s) 136 from connecting to the first network 104. In such examples, the foreign device(s) 132 and/or the rogue device(s) 136 can be disconnected from the first network 104 and prevented from re-connecting to the first network 104.

In the illustrated example of FIG. 1, the network classification system 100 includes the central server 110. The central server 110 can correspond to one or more computing servers, a distributed computing environment, etc. In some examples, the central server 110 receives local device behavior data from the sensor 112 via the second network 108. Alternatively, the central server 110 may be in communication with at least one of the one or more of the computing devices 106*a-c*, the foreign device(s) 132, the local managed device(s) 134, or the rogue device(s) via the first network 104. For example, the central server 110 may obtain local device behavior data from one or more of the computing devices 106*a-c*. The central server 110 can be implemented by one or more analog or digital circuit(s), logic circuits, programmable processor(s), programmable controller(s), GPU(s), DSP(s), ASIC(s), PLD(s), and/or FPLD(s).

In some examples, the central server 110 analyzes the local device behavior data obtained from the managed device detector 102, where the local device behavior data is associated with one or more of the foreign device(s) 132, one or more of the local managed device(s) 134, and/or one or more of the rogue device(s) 136. In such examples, the central server 110 can execute actions and/or trigger a workflow to remove one or more of the foreign device(s) 132 and/or the rogue device(s) 136 from the first network 104. In other examples, an administrator associated with the central server 110 can execute the actions and/or trigger the workflow.

The networks 104, 108 of the illustrated example of FIG. 1 correspond to the Internet. However, the networks 104, 108 may be implemented using any suitable wired and/or wireless network(s) including, for example, one or more data buses, one or more Local Area Networks (LANs), one or more wireless LANs, one or more cellular networks, one or more private networks, one or more public networks, etc. The first network 104 enables the computing devices 106a-c to be in communication with the foreign device(s) 132, the local managed device(s) 134, and/or the rogue device(s) 136. The second network 108 enables the computing devices 106a-c to be in communication with the central server 110. In some examples, the first network 104 and the second network 108 are the same network. In such examples, the foreign device(s) 132, local managed device(s) 134, rogue device(s) 136, and computing device(s) 106a-c can connect to the second network 108. For example, the network comparator 118 can compare the network configuration information of the network 108 to the network configuration whitelist 150 and/or the network configuration blacklist 152.

In the illustrated example of FIG. 1, the managed device detector 102 includes an example database 144 to record data (e.g., local device behavior data, network configuration information of the networks 104, 108, the network configuration whitelist 150, the network configuration blacklist 152, etc.). The database 144 may be implemented by a volatile memory (e.g., a Synchronous Dynamic Random Access Memory (SDRAM), Dynamic Random Access Memory (DRAM), RAMBUS® Dynamic Random Access Memory (RDRAM®), etc.) and/or a non-volatile memory (e.g., flash memory). The database 144 may additionally or alternatively be implemented by one or more double data rate (DDR) memories, such as DDR, DDR2, DDR3, DDR4, mobile DDR (mDDR), etc. The database 144 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the database 144 is illustrated as a single database, the database 144 may be implemented by any number and/or type(s) of databases. Furthermore, the data stored in the database 144 may be in any data format such as, for example, binary data, comma delimited data, tab delimited data, structured query language (SQL) structures, etc.

While an example manner of implementing the example managed device detector 102 of FIG. 1 is illustrated in FIG. 1, one or more of the elements, processes, and/or devices illustrated in FIG. 1 may be combined, divided, re-arranged, omitted, eliminated, and/or implemented in any other way. Further, the example sensor 112, the example controller 114, the example sensor controller 116, the example network comparator 118, the example database 144, the example network configuration whitelist 150, the example network configuration blacklist 152, and/or, more generally, the example managed device detector 102 of FIG. 1 may be implemented by hardware, software, firmware, and/or any combination of hardware, software, and/or firmware. Thus, for example, any of the example sensor 112, the example controller 114, the example sensor controller 116, the example network comparator 118, the example database 144, the example network configuration whitelist 150, the example network configuration blacklist 152, and/or, more generally, the example managed device detector 102 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example sensor 112, the example controller 114, the example sensor controller 116, the example network comparator 118, the example database 144, the example network configuration whitelist 150, the example network configuration blacklist 152, and/or, more generally, the example managed device detector 102 of FIG. 1 is/are hereby expressly defined to include a non-transitory computer readable storage device or storage disk such as a memory, a DVD, a CD, a Blu-ray disk, etc., including the software and/or firmware. Further still, the example managed device detector 102 of FIG. 1 may include one or more elements, processes, and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
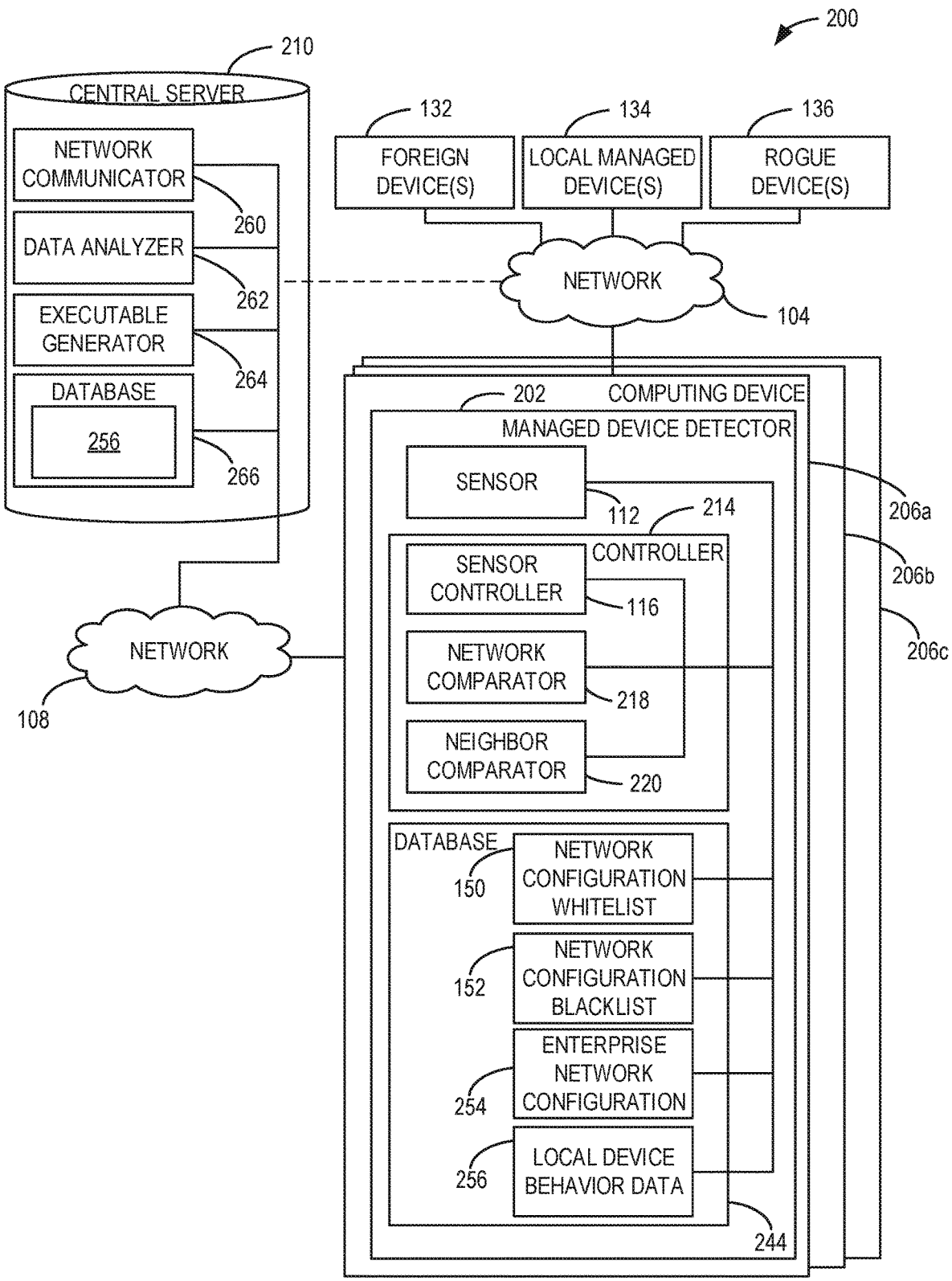
FIG. 2 depicts another example network classification system including an example central server and another example managed device detector to classify the example network of FIG. 1.

FIG. 2 depicts an example network classification system 200 including an example managed device detector 202 to classify the first network 104 of FIG. 1. In FIG. 2, the network classification system 200 includes example computing devices 206a-c including a first example computing device 206a, a second example computing device 206b, and a third example computing device 206c. In FIG. 2, the computing devices 206a-c are laptop computers. Alternatively, one or more may be a different type of computing device, such as a smart phone, a tablet computer, a desktop computer, or any other type of computing device. In FIG. 2, each of the computing devices 206a-c includes the managed device detector 202. Alternatively, one or more of the computing devices 206a-c may not include the managed device detector 202. In FIG. 2, the computing devices 206a-c are communicatively coupled to the first network 104 and the second network 108 of FIG. 1.

In the illustrated example of FIG. 2, each of the computing devices 206a-c includes the managed device detector 202 to classify a type (e.g., a network type) of the first network 104. In some examples, only one instance of the managed device detector 202 is active while the other instances of the managed device detector 202 are inactive. For example, the computing devices 206a-c may perform a negotiation process in coordination with each other to identify which one of the computing devices 206a-c is to activate a corresponding managed device detector 202. In some examples, the managed device detector 202 transmits data (e.g., device behavior data, local device behavior data, etc.) to an example central server 210 via the second network 108.

In the illustrated example of FIG. 2, the managed device detector 202 includes the sensor 112 of FIG. 1 and an example controller 214 to control and/or otherwise facilitate operation of the sensor 112. In some examples, the controller 214 adjusts, configures, and/or otherwise sets a mode (e.g., a sensor mode) of the sensor 112 as described above in connection with FIG. 1. In some examples, the controller 214 adjusts, configures, and/or otherwise sets one or more configuration parameters of the sensor 112 as described above in connection with FIG. 1. The controller 214 can be implemented by one or more analog or digital circuit(s), logic circuits, programmable processor(s), programmable controller(s), GPU(s), DSP(s), ASIC(s), PLD(s), and/or FPLD(s).

In the illustrated example of FIG. 2, the controller 214 includes the sensor controller 116 of FIG. 1 to control and/or otherwise facilitate operation of the sensor 112 as described above in connection with FIG. 1. For example, the sensor controller 116 can set the sensor 112 to the discovery mode in response to the computing device 206a-c connecting to a network (e.g., the first network 104) for the first time. In other examples, the sensor controller 116 can set the sensor 112 to the active mode in response to an example network comparator 218 determining that the network configuration information of the first network 104 matches network configuration information in the network configuration whitelist 150 of FIG. 1. In yet other examples, the sensor controller 116 can set the sensor 112 to the passive mode in response to the network comparator 218 determining that the network configuration information of the first network 104 matches network configuration information in the network configuration blacklist 152 of FIG. 1.

In some examples, the sensor controller 116 sets the sensor 112 to the active mode in response to an example neighbor comparator 220 determining that a number or a quantity of local managed devices satisfies a threshold. In other examples, the sensor controller 116 can set the sensor 112 to the passive mode in response to the neighbor comparator 220 determining that the number of the local managed neighbors does not satisfy a threshold.

In some examples, the sensor controller 116 launches a user interface on a respective one of the computing devices 206a-c when a number of the local managed devices satisfies a second threshold but does not satisfy a first threshold, where the first threshold is representative of a first quantity of the local managed devices, the second threshold is representative of a second quantity of the local managed devices, and the first quantity is greater than the second quantity. The sensor controller 116 can invoke the sensor 112 to obtain data associated with the first network 104 when the user interface obtains a first response (e.g., from a user of the respective one of the computing devices 206a-c) indicative of the first network 104 corresponding to a managed network.

In some examples, the sensor controller 116 invokes the sensor 112 to obtain a first type of data (e.g., a first data type) that corresponds to data from at least one of one or more of the foreign devices 132, one or more of the local managed devices 134, or the rogue devices 136 that is not to be anonymized prior to transmitting to the central server 110 of FIG. 1, the central server 210 of FIG. 2, etc. In some examples, the sensor controller 116 can invoke the sensor 112 to obtain a second type of data (e.g., a second data type) that corresponds to data from at least one of one or more of the foreign devices 132, one or more of the local managed devices 134, or the rogue devices 136 that is to be anonymized prior to transmitting to the central server 110 of FIG. 1, the central server 210 of FIG. 2, etc. In some examples, the sensor controller 116 instructs the sensor 112 to not obtain the data associated with the first network 104 when the user interface obtains a second response indicative of the first network 104 corresponding to an unmanaged network.

In the illustrated example of FIG. 2, the controller 214 includes the neighbor comparator 220 to classify the local devices connected to the first network 104. In some examples, the neighbor comparator 220 generates a discovery packet based on an encryption key. For example, the neighbor comparator 220 can generate and transmit a discovery packet signed by an encryption key and/or the discovery packet is generated based on the encryption key. In such examples, the neighbor comparator 220 can transmit the signed discovery packet to the local devices connected to the first network 104 and analyze responses from the local devices. In some examples, the neighbor comparator 220 generates the encryption key. In other examples, the neighbor comparator 220 obtains the encryption key. For example, the neighbor comparator 220 can obtain the encryption key from a server (e.g., the central server 110 of FIG. 1, the central server 210 of FIG. 2, a different server, etc.) corresponding to a trusted third-party security or encryption association, organization, and/or service (e.g., software service).

In some examples, the neighbor comparator 220 can be implemented by one or more analog or digital circuit(s), logic circuits, programmable processor(s), programmable controller(s), GPU(s), DSP(s), ASIC(s), PLD(s), and/or FPLD(s). In some examples, the neighbor comparator 220 implements means for identifying a number of different computing devices on the first network 104 that are managed computing devices (e.g., the local managed devices 134).

In some examples, the neighbor comparator 220 generates the discovery packet based on an encryption key that corresponds to a symmetric encryption algorithm. For example, the neighbor comparator 220 can encrypt a discovery packet using a symmetric encryption technique (e.g., the Advanced Encryption Standard (AES) that uses a block cipher (e.g., the AES-128 block cipher, the AES-192 block cipher, the AES-256 block cipher, etc.)) to encrypt data (e.g., one or more alphanumeric characters, machine readable data or values, etc.) included in a payload and/or, more generally, the discovery packet. In other examples, the neighbor comparator 220 can encrypt the discovery packet using an AES cipher block chaining (AES-CBC) algorithm, a ciphertext feedback (AES-CFB) algorithm, an AES output feedback (AES-OFB) algorithm, a 2-byte CBC message authentication code (CBC-MAC) algorithm, a Galois MAC (GMAC) algorithm, or a keyed-Hashing MAC (HMAC) algorithm. Alternatively, the neighbor comparator 220 may encrypt the discovery packet using any other symmetric algorithm.

In some examples, the neighbor comparator 220 generates the discovery packet based on an encryption key that corresponds to an asymmetric encryption technique based on using two independent keys (e.g., encryption keys, encryption signatures, etc.). For example, the neighbor comparator 220 can generate a first key to encrypt the discovery packet and a local device can decrypt the discovery packet using a second key different from the first key. In such examples, the local device can encrypt a response packet using the first key or the second key. For example, the neighbor comparator 220 can encrypt the discovery packet using a Diffie-Hellman key exchange, a Rivest-Shamir-Adleman (RSA) algorithm, or a cryptographic hash function such as secure hash algorithm 1 (SHA-1), SHA-2, or SHA-3. Alternatively, the neighbor comparator 220 may encrypt the discovery packet using any other asymmetric encryption technique.

In some examples, the neighbor comparator 220 determines the total number of local devices connected to the network 104 and classifies each of the local devices based on a respective response, or, in some examples, a lack of a respective response, to the signed discovery packet. For example, when a local device responds to the signed discovery packet with a response packet signed by an incorrect encryption key and/or the response packet is generated based on the incorrect encryption key, the neighbor comparator 220 classifies the local device as one of the foreign device(s) 132. In other examples, when a local device responds to the signed discovery packet with a response packet that is signed by the correct or an otherwise expected encryption key, the neighbor comparator 220 can classify the local device as one of the local managed device(s) 134. In yet other examples, when a local device does not respond to the discovery packet, the neighbor comparator 220 can classify the local device as one of the rogue device(s) 136.

In some examples, the neighbor comparator 220 compares a total number of the local managed devices 134 to at least a first threshold and a second threshold, where the first threshold is less than the second threshold. The neighbor comparator 220 can determine a type of data (e.g., a first type of data, a second type of data, no data, etc.) to be collected from one or more computing devices associated with the first network 104 based on whether the total number of the local managed devices 134 satisfy the first threshold, the second threshold, etc., and/or a combination thereof. In some examples, the first threshold is representative of a first quantity of the managed computing devices and the second threshold can be representative of a second quantity of the managed computing devices, where the first quantity is greater than the second quantity. In such examples, when a first number of the local managed devices 134 does not satisfy the first threshold because the first number is less than the first threshold, the neighbor comparator 220 can invoke the sensor controller 116 to adjust the sensor 112 to the passive mode. When the total number of the local managed devices 134 does not satisfy the first threshold, the neighbor comparator 220 can determine that the first network 104 is not communicatively coupled with a sufficient number of the local managed devices 134 to correspond to and/or otherwise be identified as an enterprise network (e.g., a managed network).

In some examples, when the first number of the local managed devices 134 satisfies the second threshold because the first number is greater than or equal to the second threshold, the neighbor comparator 220 can invoke the sensor controller 116 to configure the sensor 112 to the active mode. For example, the sensor controller 116 can instruct the sensor 112 to obtain data associated with at least one of the foreign device(s) 132, the local managed device(s) 134, or the rogue device(s) 136. When the total number of the local managed devices 134 satisfies the second threshold, the neighbor comparator 220 can determine that the first network 104 is communicatively coupled with a sufficient number of the local managed devices 134 to correspond to and/or otherwise be identified as an enterprise network (e.g., a managed network).

In some examples, when the first number of the local managed devices 134 satisfies the first threshold but does not satisfy the second threshold because the first number is greater than or equal to the first threshold but the first number is less than the second threshold, the neighbor comparator 220 can invoke the sensor controller 116 to direct the sensor 112 to collect and anonymize local device behavior data from the local devices and transmit the anonymized data to the central server 210. When the total number of the local managed devices 134 satisfies the first threshold but does not satisfy the second threshold, the neighbor comparator 220 can determine that the first network 104 is communicatively coupled with a sufficient number of the local managed devices 134 to be identified as a candidate enterprise network and, thus, identified for further analysis to determine whether the first network 104 is an enterprise network. In response to identifying the first network 104 as a candidate enterprise network, the neighbor comparator 220 can obtain additional information (e.g., the local device behavior data 256) associated with the first network 104 to determine a classification of the first network 104.

In the illustrated example of FIG. 2, the controller 214 includes the network comparator 218 to classify the first network 104 based on network configuration information associated with the first network 104. For example, the network comparator 218 can compare network configuration information associated with the first network 104 to the network configuration whitelist 150 of FIG. 1, the network configuration blacklist 152 of FIG. 1, and/or example enterprise network configuration (e.g., enterprise network configuration information) 254. In such examples, the network comparator 218 of FIG. 2 can compare network configuration information associated with the first network 104 to the network configuration whitelist 150 and/or the network configuration blacklist 152 as described above in connection with FIG. 1.

In some examples, the network comparator 218 can be implemented by one or more analog or digital circuit(s), logic circuits, programmable processor(s), programmable controller(s), GPU(s), DSP(s), ASIC(s), PLD(s), and/or FPLD(s). In some examples, the network comparator 218 implements means for determining whether a network (e.g., the first network 104) to be connected by a computing device (e.g., the computing devices 206a-c) is a managed network based on network configuration information associated with the network.

In some examples, the network comparator 218 classifies the first network 104 as an enterprise network in response to the network comparator 218 determining that the network configuration whitelist 150 includes and/or otherwise corresponds to one or more portions of the network configuration information of the first network 104. In response to classifying the network 104 as an enterprise network, the network comparator 218 can invoke the sensor controller 116 to set the sensor 112 to the active mode.

In some examples, the enterprise network configuration 254 includes information about a known enterprise network configuration. For example, the enterprise network configuration 254 may include an IP address, a subnet mask, an IP port range, a name (e.g., a SSID), a type of encryption and/or security protocol associated with the enterprise that is affiliated with and/or is otherwise managing the computing devices 206a-c. For example, the network comparator 218 can compare network configuration information of the first network 104 such as an IP address, a subnet mask, an SSID, etc., to an enterprise IP address, an enterprise subnet mask, an enterprise SSID, etc., included in the enterprise network configuration 254. In such examples, when the enterprise network configuration 254 includes one or more portions of the network configuration information of the first network 104, the sensor controller 116 can set the sensor 112 to the active mode because the network comparator 218 can identify the first network 104 as an enterprise network.

In some examples, the network comparator 218 classifies the first network 104 as an unmanaged network in response to the network comparator 218 determining that the network configuration blacklist 152 includes one or more portions of the network configuration information of the first network 104. In response to classifying the network 104 as an unmanaged network, the network comparator 218 can invoke the sensor controller 116 to set the sensor 112 to the passive mode.

In some examples, the sensor controller 116 sets the sensor 112 to the discovery mode in response to the network comparator 218 not associating the network configuration information of the first network 104 with at least one of the enterprise network configuration 254, the network configuration whitelist 150, or the network configuration blacklist 152. In some examples, the sensor controller 116 sets the sensor 112 to the discovery mode when connected to a different network and/or when connected to a network for the first time.

In the illustrated example of FIG. 2, the managed device detector 202 includes an example database 244 to record data (e.g., the local device behavior data 256, network configuration information associated with the networks 104, 108, the network configuration whitelist 150, the network configuration blacklist 152, the enterprise network configuration 254, etc.). The database 244 of the illustrated example of FIG. 2 may be implemented by a volatile memory (e.g., a SDRAM, DRAM, RDRAM®, etc.) and/or a non-volatile memory (e.g., flash memory). The database 244 may additionally or alternatively be implemented by one or more DDR memories, such as DDR, DDR2, DDR3, DDR4, mDDR, etc. The database 244 may additionally or alternatively be implemented by one or more mass storage devices such as HDD(s), CD drive(s), DVD drive(s), SSD drive(s), etc. While in the illustrated example the database 244 is illustrated as a single database, the database 244 may be implemented by any number and/or type(s) of databases. Furthermore, the data stored in the database 244 may be in any data format such as, for example, binary data, comma delimited data, tab delimited data, SQL structures, etc.

In the illustrated example of FIG. 2, the network classification system 200 includes the foreign device(s) 132, the local managed device(s) 134, and the rogue device(s) 136 of FIG. 1. In some examples, when in the active mode, the sensor 112 collects and/or otherwise obtains local device behavior data from one or more of the foreign device(s) 132, one or more of the local managed device(s) 134, and/or one or more of the rogue device(s) 136. In such examples, sensor 112 can save and/or otherwise store the local device behavior data as example local device behavior data 256 in an example database 244 of the managed device detector 202.

In the illustrated example of FIG. 2, the network classification system 200 includes the central server 210 to receive anonymized local device behavior data 256 from the managed device detector 202. The central server 210 can correspond to one or more computer servers, a distributed computing environment, etc. The central server 210 can be implemented by one or more analog or digital circuit(s), logic circuits, programmable processor(s), programmable controller(s), GPU(s), DSP(s), ASIC(s), PLD(s), and/or FPLD(s).

In some examples, the central server 210 analyzes the anonymized local device behavior data 256 to determine the classification of the local devices corresponding to the anonymized local device behavior data 256. In some examples, the central server 210 determines that a threshold (e.g., the first threshold of responses, the second threshold of responses, etc.) utilized by the managed device detector 202 requires an adjustment or modification. In such examples, the central server 210 can generate a new network classification model with one or more different thresholds and transmit the new network classification model to one or more instances of the managed device detector 202. For example, the new network classification model can correspond to an executable (e.g., a binary file, machine readable instructions, etc.) to update the one or more instances of the managed device detector 202. In FIG. 2, the central server 210 includes an example network communicator 260, an example data analyzer 262, an example executable generator 264, and an example database 266.

In the illustrated example of FIG. 2, the central server 210 includes the network communicator 260 to receive data from the sensor 112 via the second network 108 and/or transmit information (e.g., an executable, an updated network classification model, etc.) to the sensor 112 via the second network 108. In FIG. 2, the network communicator 260 implements a web server that receives network configuration information, the local device behavior data 256, etc., from one or more of the computing devices 206a-c, one or more of the foreign device(s) 132, one or more of the local managed device(s) 134, and/or one or more of the rogue device(s) 136. For example, the network communicator 260 can be a transmitter, a receiver, a transceiver, and/or a network interface to facilitate exchange of data with external machines (e.g., computing devices of any kind) via the first network 104 and/or the second network 108. In such examples, the network communicator 260 can be implemented by one or more analog or digital circuit(s), logic circuits, programmable processor(s), programmable controller(s), ASIC(s), PLD(s), and/or FPLD(s).

In some examples, the network configuration information, the local device behavior data 256, etc., can be formatted as one or more HTTP messages, one or more HTTP data packets, etc. However, any other message format and/or protocol may additionally or alternatively be used such as, for example, a file transfer protocol (FTP), a simple message transfer protocol (SMTP), an HTTP secure (HTTPS) protocol, etc.

In some examples, the network communicator 260 adds one or more of the foreign device(s) 132 and/or one or more of the rogue device(s) 136 to a list of managed devices controlled and/or otherwise overseen by the central server 210, an administrator associated with the central server 210, etc. In other examples, the network communicator 260 can block one or more of the foreign device(s) 132 and/or one or more of the rogue device(s) 136 from connecting to a managed network.

In the illustrated example of FIG. 2, the central server 210 includes the data analyzer 262 to analyze the data received from the sensor 112 and/or, more generally, the managed device detector 202. For example, the data analyzer 262 can identify the programs and/or applications installed and/or running on the local device(s) based on the obtained data. The data analyzer 262 can determine the number of local managed device(s) dependent on the identification of the programs and/or applications installed and/or running on the local device(s) based on the obtained data. For example, the data analyzer 262 can identify a program version installed on a local device as provided by the enterprise and determine the local device to be a local managed device 134. The data analyzer 262 can be implemented by one or more analog or digital circuit(s), logic circuits, programmable processor(s), programmable controller(s), GPU(s), DSP(s), ASIC(s), PLD(s), and/or FPLD(s).

In some examples, the data analyzer 262 executes an analysis model based on the anonymized data. For example, the data analyzer 262 can analyze the anonymized local device behavior data 256 by executing the analysis model to compare the anonymized local device behavior data 256 with historical or previously obtained anonymized local device behavior data. In such examples, the data analyzer 262 can determine an average, typical, and/or otherwise expected number of local managed device(s) for a network such as the first network 104.

In some examples, the data analyzer 262 determines the number of the local managed device(s) 134 on the first network 104 based on the anonymized local device behavior data 256. In such examples, the data analyzer 262 can determine that a threshold utilized by the managed device detector 202 requires a modification based on the number of the local managed device(s) 134 in view of the historical anonymized local device behavior data. For example, the data analyzer 262 may determine that a network such as the first network 104 typically has five or more local managed devices 134 while the anonymized local device behavior data 256 indicates that there are less than five of the local managed devices 134, more than five of the local managed devices 134, etc., on the first network 104. In response to determining that the number of the local managed devices 134 is different from the number of local managed devices based on the historical data, the data analyzer 262 can determine to modify (e.g., increase or decrease) the first threshold and/or the second threshold.

In some examples, the data analyzer 262 can invoke the network communicator 260 to execute actions and/or trigger a workflow associated with a managed network. For example, the data analyzer 262 can instruct the network communicator 260 to add one or more of the foreign device(s) 132 and/or the rogue device(s) 136 to a list of managed devices. In other examples, the data analyzer 262 can direct the network communicator 260 to remove one or more of the foreign device(s) 132 and/or the rogue device(s) 136 from the first network 104.

In the illustrated example of FIG. 2, the central server 210 includes the executable generator 264 to generate a new executable (e.g., a binary file, machine readable instructions, an installer to deploy a program, etc.) based on a determination by the data analyzer 262 to adjust one or more thresholds used by the managed device detector 202. In such examples, the executable generator 264 can generate new versions of the sensor controller 116, the network comparator 218, the neighbor comparator 220, and/or, more generally, the controller 214 and/or the managed device detector 202. For example, the executable that, when deployed by the managed device detector 202, can classify the first network 104 using different threshold(s). In response to generating the executable, the executable generator 264 can invoke the network communicator 260 to transmit the executable to one or more instances of the managed device detector 202. The executable generator 264 can be implemented by one or more analog or digital circuit(s), logic circuits, programmable processor(s), programmable controller(s), GPU(s), DSP(s), ASIC(s), PLD(s), and/or FPLD(s).

In some examples, the executable generator 264 determines whether to generate a new executable corresponding to a new version of the managed device detector 202. For example, the executable generator 264 can query the administrator associated with the central server 210 whether to accept the modification recommendation (e.g., the recommendation to adjust one or more thresholds). In other examples, the executable generator 264 can determine to accept the modification recommendation and, thus, determine to generate a new executable for deployment to one or more instances of the computing devices 206a-c. In yet other examples, the executable generator 264 can determine to decline the modification recommendation and, thus, determine not to generate a new executable for deployment to one or more instances of the computing devices 206a-c.

In the illustrated example of FIG. 2, the central server 210 includes the database 266 to record data (e.g., the anonymized local device behavior data 256, network configuration information associated with the networks 104, 108, etc.). For example, the sensor 112 of one or more instances of the managed device detector 202 can transmit the anonymized local device behavior data 256 to the database 266 via the network 108 when the corresponding sensor(s) 112 are in the active mode or the discovery mode.

The database 266 of the illustrated example of FIG. 2 may be implemented by a volatile memory (e.g., a SDRAM, DRAM, RDRAM®, etc.) and/or a non-volatile memory (e.g., flash memory). The database 266 may additionally or alternatively be implemented by one or more DDR memories, such as DDR, DDR2, DDR3, DDR4, mDDR, etc. The database 266 may additionally or alternatively be implemented by one or more mass storage devices such as HDD(s), CD drive(s), DVD drive(s), SSD drive(s), etc. While in the illustrated example the database 266 is illustrated as a single database, the database 266 may be implemented by any number and/or type(s) of databases. Furthermore, the data stored in the database 266 may be in any data format such as, for example, binary data, comma delimited data, tab delimited data, SQL structures, etc.

In an example operation, the first computing device 206a connects to the first network 104, where the first network 104 is a non-enterprise network (e.g., a public Wi-Fi network). In response to connecting to the first network 104, the sensor controller 116 sets the sensor 112 to discovery mode. In discovery mode, the sensor 112 acquires the network routing configuration of the first network 104. In response to acquiring the network routing configuration of the first network 104, the network comparator 218 compares the network routing configuration to the network configuration whitelist 150, the network configuration blacklist 152, and the enterprise network configuration 254. If the network configuration whitelist 150 and/or the enterprise network configuration 254 includes the networking routing information, the network comparator 218 invokes the sensor controller 116 to set the sensor 112 to the active mode. If the network configuration blacklist includes the network configuration information, the network comparator 218 invokes the sensor controller 116 to set the sensor 112 to the passive mode. If none of the network configuration whitelist 150, the network configuration blacklist 152, or the enterprise network configuration 254 includes the network configuration information, the network comparator 218 invokes the neighbor comparator 220 to scan and classify the local device(s) communicatively coupled to the network 104.

In an example operation, the neighbor comparator 220 transmits a discovery packet signed by an encryption key to the local device(s) communicatively coupled to the first network 104 and classifies the local device(s) based on the response (or lack of response) of the local device(s) to the discovery packet. The neighbor comparator 220 compares the total number of the local managed device(s) 134 to the first threshold and the second threshold, where the second threshold is greater than the first threshold. If the total number of the local managed device(s) 134 does not satisfy the first threshold, the neighbor comparator 220 invokes the sensor controller 116 to set the sensor 112 to the passive mode. If the total number of the local managed device(s) 134 satisfies the second threshold, the neighbor comparator 220 invokes the sensor controller 116 to set the sensor 112 to the active mode. If the total number of the local managed device(s) 134 satisfies the first threshold but does not satisfy the second threshold, the neighbor comparator 220 invokes the sensor controller 116 to instruct the sensor 112 to collect the local device behavior data 256 from the local device(s), anonymize the local device behavior data 256, and transmit the anonymized data (e.g., an anonymized version of the local device behavior data 256) to the central server 210.

In an example operation, the central server 210 receives the anonymized data in response to the neighbor comparator 220 determining that the number of the local managed device(s) 134 satisfies the first threshold but does not satisfy the second threshold. The data analyzer 262 analyzes the anonymized data to determine whether at least one of the first threshold or the second threshold require a modification to improve an accuracy and/or, more generally, an operation of the managed device detector 202 to classify a network such as the first network 104. If the data analyzer 262 determines that the first threshold and/or the second threshold require a modification, the data analyzer 262 invokes the executable generator 264 to generate a new executable based on the modified threshold(s). The network communicator 260 transmits the new executable to the computing device(s) 206a-c to update one or more components of the managed device detector 202 and/or, more generally, the managed device detector 202.

While an example manner of implementing the example managed device detector 202 of FIG. 2 and the example central server 210 of FIG. 2 is illustrated in FIG. 2, one or more of the elements, processes, and/or devices illustrated in FIG. 2 may be combined, divided, re-arranged, omitted, eliminated, and/or implemented in any other way. Further, the example sensor 112, the example controller 214, the example sensor controller 116, the example network comparator 218, the example neighbor comparator 220, the example database 244, the example network configuration whitelist 150, the example network configuration blacklist 152, the example enterprise network configuration 254, the example local device behavior 256, and/or, more generally, the example managed device detector 202 of FIG. 2 and/or the example network communicator 260, the example data analyzer 262, the example executable generator 264, the example database 266, the example local device behavior data 256, and/or, more generally, the example central server 210 of FIG. 2 may be implemented by hardware, software, firmware, and/or any combination of hardware, software, and/or firmware. Thus, for example, any of the example sensor 112, the example controller 214, the example sensor controller 116, the example network comparator 218, the example neighbor comparator 220, the example database 244, the example network configuration whitelist 150, the example network configuration blacklist 152, the example enterprise network configuration 254, the example local device behavior 256, and/or, more generally, the example managed device detector 202 of FIG. 2 and/or the example network communicator 260, the example data analyzer 262, the example executable generator 264, the example database 266, the example local device behavior data 256, and/or, more generally, the example central server 210 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example sensor 112, the example controller 214, the example sensor controller 116, the example network comparator 218, the example neighbor comparator 220, the example database 244, the example network configuration whitelist 150, the example network configuration blacklist 152, the example enterprise network configuration 254, the example local device behavior 256, and/or, more generally, the example managed device detector 202 of FIG. 2 and/or the example network communicator 260, the example data analyzer 262, the example executable generator 264, the example database 266, the example local device behavior data 256, and/or, more generally, the example central server 210 of FIG. 2 is/are hereby expressly defined to include a non-transitory computer readable storage device or storage disk such as a memory, a DVD, a CD, a Blu-ray disk, etc., including the software and/or firmware. Further still, the example managed device detector 202 and/or the central server 210 of FIG. 2 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
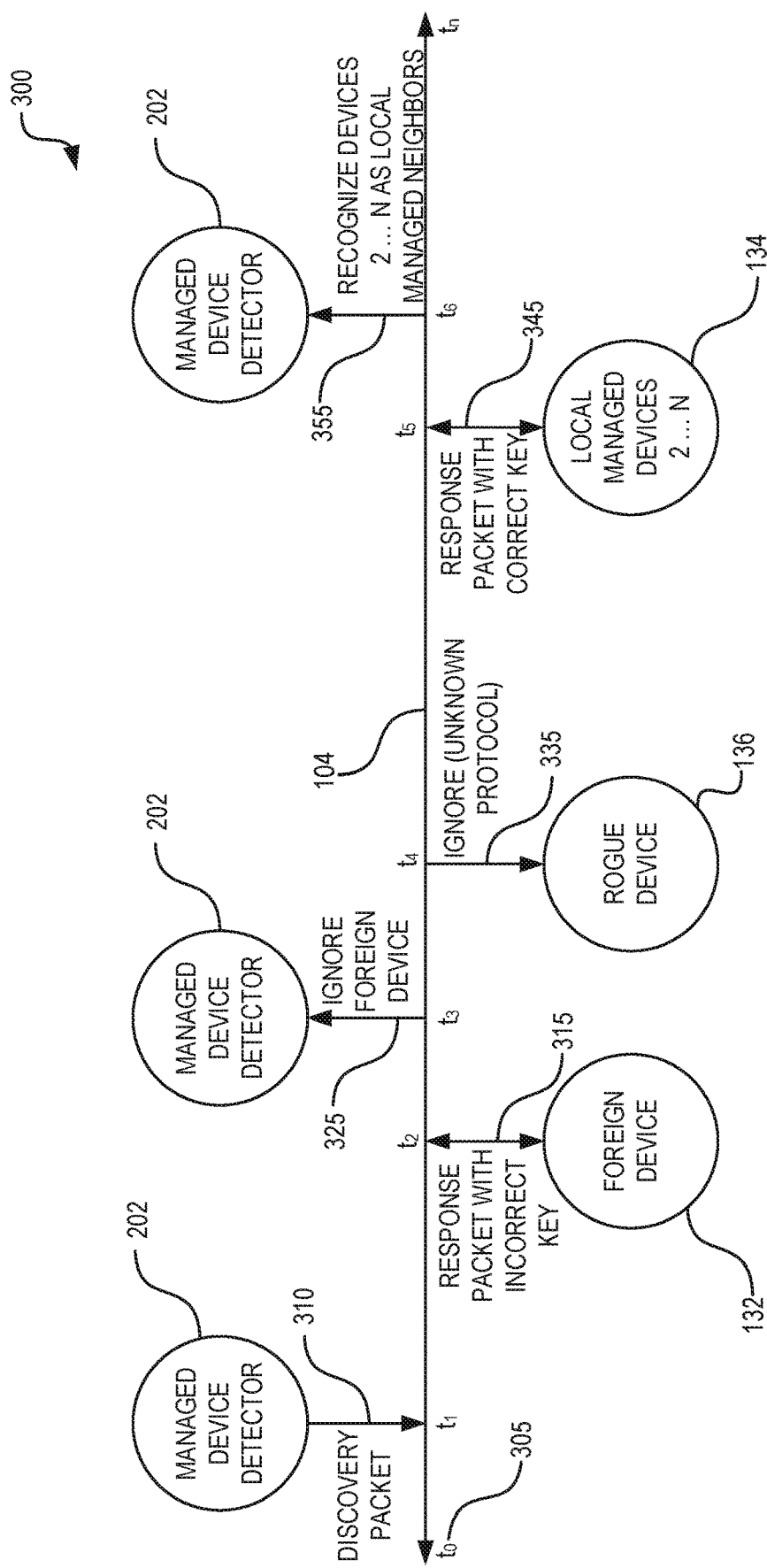
FIG. 3 is a schematic illustration of the example managed device detector of FIG. 2 classifying the example network of FIGS. 1 and/or 2.

FIG. 3 depicts a schematic illustration of an example workflow 300 representative of the managed device detector 202 of FIG. 2 classifying the first network 104 of FIGS. 1 and/or 2. The workflow 300 of FIG. 3 corresponds to an example process of the managed device detector 202 classifying the different local devices communicatively coupled to the first network 104.

In the illustrated example of FIG. 3, at an example initial time ($t_0$) 305, the managed device detector 202 can obtain network configuration information associated with the first network 104 of FIGS. 1 and/or 2. At the initial time 305, the managed device detector 202 can compare the network configuration information to the network configuration whitelist 150 of FIGS. 1 and/or 2, the network configuration blacklist 152 of FIGS. 1 and/or 2, and/or the enterprise network configuration 254 of FIG. 2. At a first example time ($t_1$) 310, the managed device detector 202 determines that the network configuration information is not included in the database 244 of FIG. 2. At the first time 310, in response to not classifying the first network 104, the managed device detector 202 transmits a discovery packet to the first network 104.

In the illustrated example of FIG. 3, a first one of the foreign device(s) 132 receives the discovery packet via the first network 104 at a second example time ($t_2$) 315. In response to receiving the discovery packet, the first one of the foreign device(s) 132 responds with a data packet signed with an incorrect or unexpected encryption key. The first one of the foreign device(s) 132 transmits the response to the managed device detector 202 via the first network 104. At a third example time ($t_3$) 325, the managed device detector 202 determines that the encryption key associated with the response is an incorrect encryption key. In response to determining that the encryption key is incorrect, the managed device detector 202 ignores the response.

In the illustrated example of FIG. 3, at a fourth example time ($t_4$) 335, a first one of the rogue device(s) 136 receive the discovery packet via the first network 104. In response to receiving the discovery packet, the first one of the rogue device(s) 136 ignores the discovery packet because the discovery packet is formatted and/or otherwise generated based on an unknown protocol. At the fourth time 335, the first one of the rogue device(s) 136 does not transmit a response to the managed device detector 202 via the first network 104.

In the illustrated example of FIG. 3, one or more of the local managed device(s) 134 receive the discovery packet via the first network 104 at a fifth example time ($t_5$) 345. In response to receiving the discovery packet, at the fifth time 345, the one or more of the local managed device(s) 134 respond with a correct or expected encryption key. The one or more local managed device(s) 134 transmit the one or more responses to the managed device detector 202 via the first network 104. The managed device detector receives the one or more responses from the one or more local managed device(s) 134 via the first network 104 at a sixth example time ($t_6$) 355. In response to receiving the one or more responses, the managed device detector 202 determines that the encryption key associated with the one or more responses is the correct encryption key and counts and/or otherwise enumerates the number of the one or more local managed device(s) 134 that responded with the expected encryption key.

Figure 9:
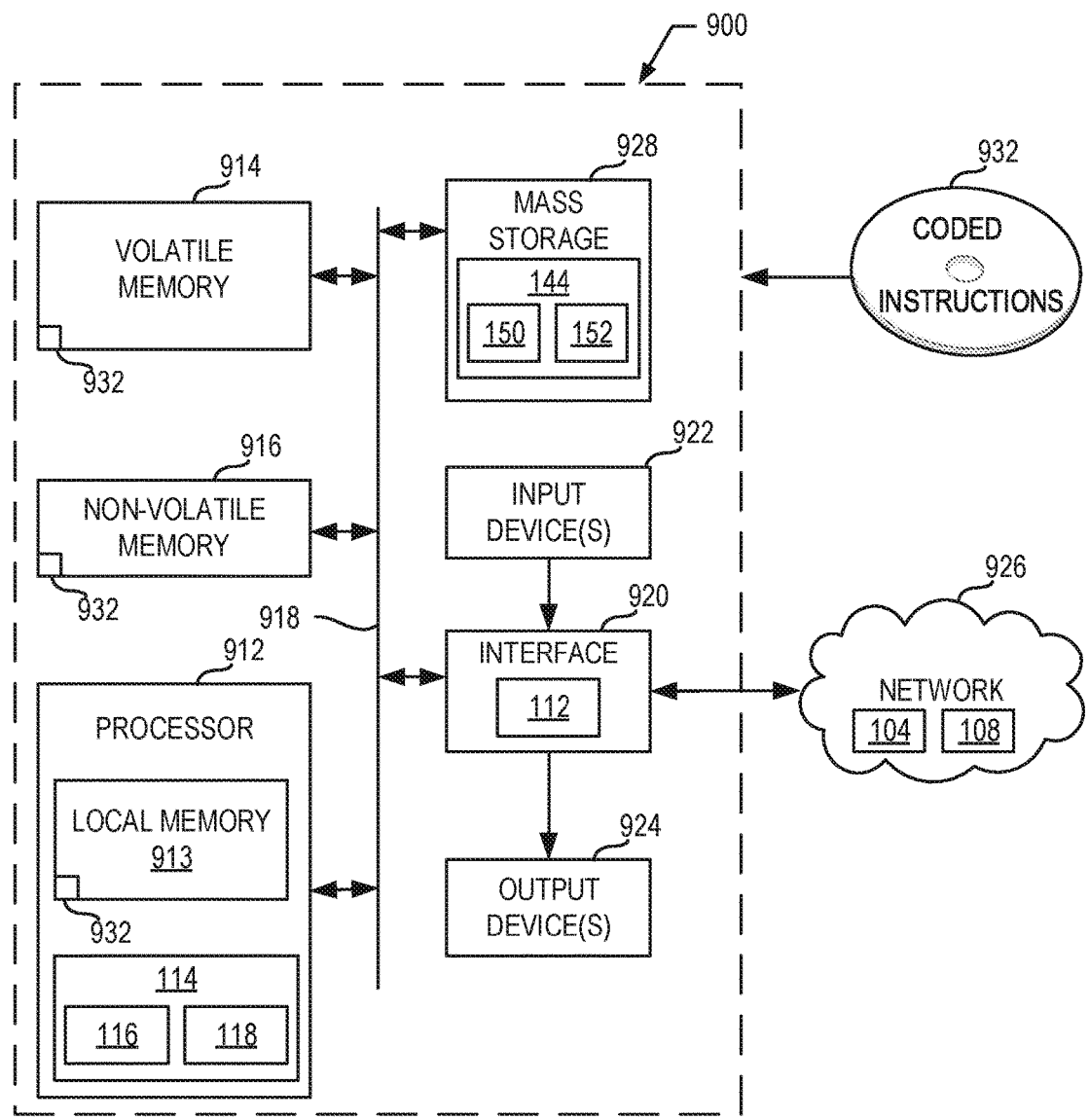
FIG. 9 is a block diagram representation of an example processing platform structured to execute the example machine readable instructions of FIG. 4 to implement the example managed device detector of FIG. 1.
Figure 10:
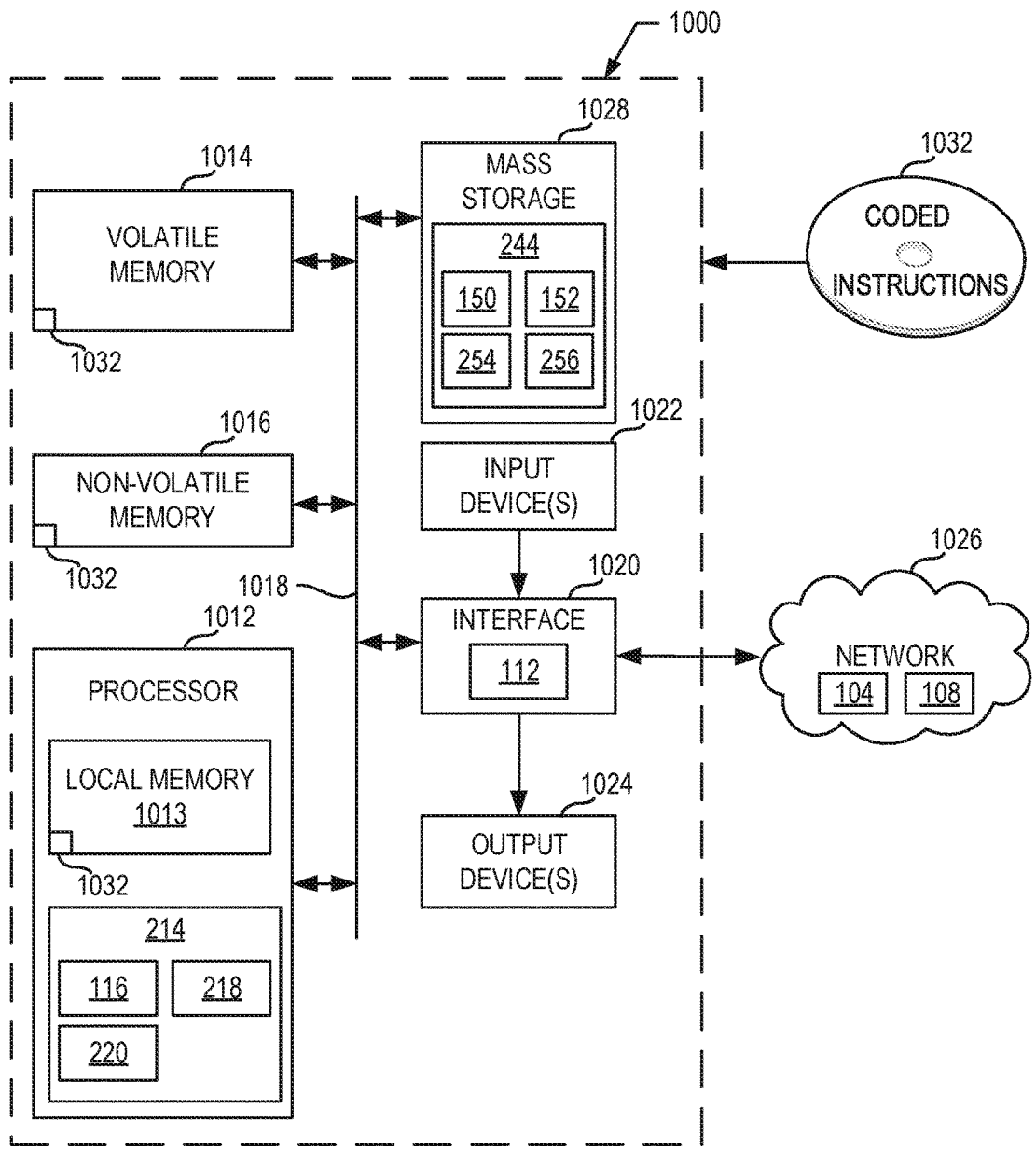
FIG. 10 is a block diagram representation of an example processing platform structured to execute the example machine readable instructions of FIGS. 5-7 to implement the example managed device detector of FIGS. 2 and/or 3.

Flowcharts representative of example hardware logic, machine readable instructions, hardware implemented state machines, and/or any combination thereof for implementing the example managed device detector 102 of FIG. 1 and/or the example managed device detector 202 of FIGS. 2 and/or 3 are shown in FIGS. 4-7. The machine readable instructions may be an executable program or portion of an executable program for execution by a computer processor such as the processor 912 of FIG. 9 shown in the example processor platform 900 of FIG. 9 discussed below in connection with FIG. 9 and/or the processor 1012 of FIG. 10 shown in the example processor platform 1000 of FIG. 10 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 912 of FIG. 9 and/or the processor 1012 of FIG. 10, but the entire program and/or parts thereof could alternatively be executed by a device other than the processors 912, 1012 of FIGS. 9 and/or 10 and/or embodied in firmware or dedicated hardware. Further, although the example program is described with reference to the flowcharts illustrated in FIG. 4-7, many other methods of implementing the example managed device detector 102 of FIG. 1 and/or the example managed device detector 202 of FIGS. 2 and/or 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-7 may be implemented using executable instructions (e.g., computer and/or machine readable instructions) stored on a non-transitory computer and/or machine readable medium such as a hard disk drive, a flash memory, a read-only memory, a CD, a DVD, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 4:
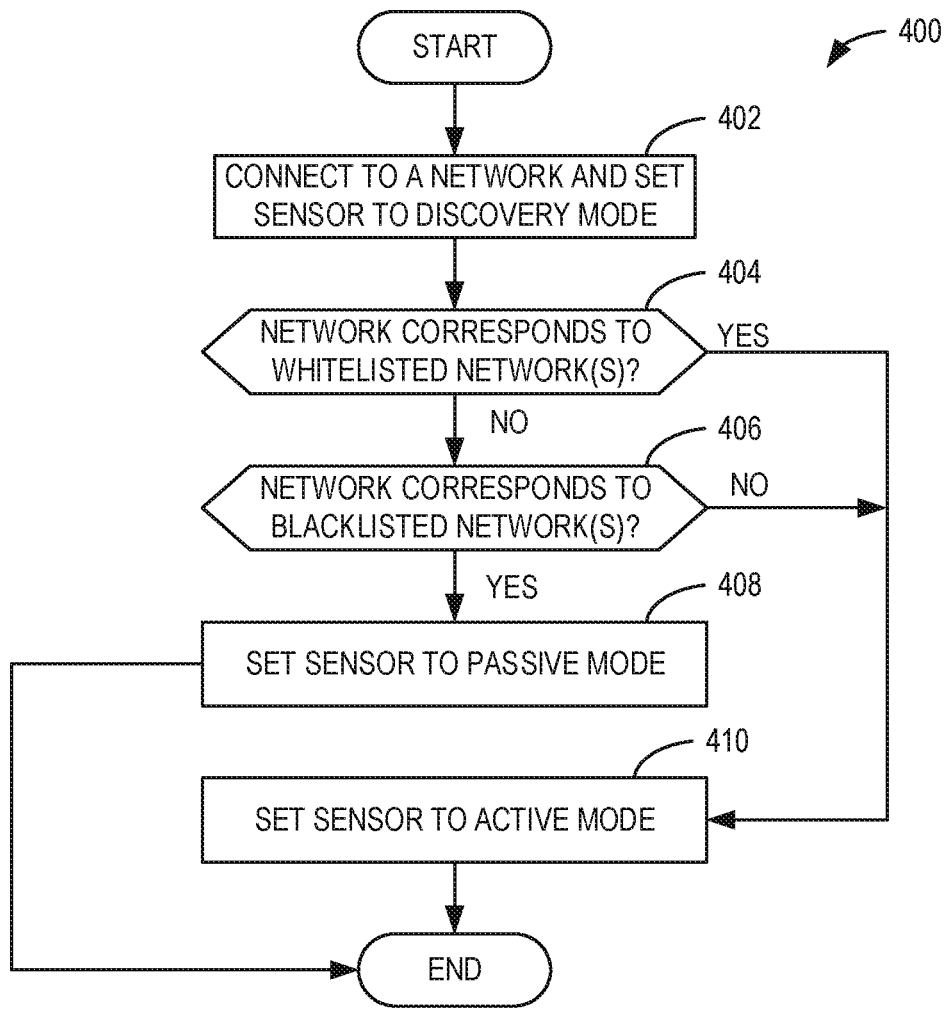
FIG. 4 is a flowchart representative of example machine readable instructions that may be executed to implement the example managed device detector of FIG. 1 to control an example sensor in response to a classification of the example network of FIGS. 1, 2, and/or 3.

FIG. 4 is a flowchart representative of example machine readable instructions 400 that may be executed by the managed device detector 102 of FIG. 1 and/or the managed device detector 202 of FIGS. 2 and/or 3 to classify the first network 104 of FIGS. 1-3. The machine readable instructions 400 of FIG. 4 begin at block 402, at which the managed device detector 102, 202 connects to a network and sets a sensor to discovery mode. For example, the sensor 112 of FIGS. 1 and/or 2 can connect to the first network 104. In such examples, the sensor controller 116 of FIGS. 1 and/or 2 can set the sensor 112 to discovery mode.

At block 404, the managed device detector 102, 202 determines whether the network corresponds to a whitelisted network. For example, the network comparator 118 of FIG. 1 and/or the network comparator 218 of FIG. 2 can determine that the first network 104 corresponds to a whitelisted network in response to determining that one or more portions of network configuration information associated with the first network 104 are included in the network configuration whitelist 150 of FIGS. 1 and/or 2. In other examples, the network comparator 118 of FIG. 1 and/or the network comparator 218 of FIG. 2 can determine that the first network 104 does not correspond to a whitelisted network in response to determining that one or more portions of network configuration information associated with the first network 104 are not included in the network configuration whitelist 150 of FIGS. 1 and/or 2.

If, at block 404, the managed device detector 102, 202 determines that the network corresponds to the whitelisted network(s), control proceeds to block 410 to set the sensor 112 to active mode. For example, the network comparator 118, 218 can notify the sensor controller 116 that the network configuration whitelist 150 includes the network configuration information associated with the first network 104 or the network configuration blacklist 152 does not include the network configuration information associated with the first network 104. In response to the notification, the sensor controller 116 can set the sensor 112 to the active mode. For example, while in the active mode, the sensor 112 can scan the local device(s) on the first network 104 and transmit information collected from the local device(s) to the central server 110, 210 of FIGS. 1 and/or 2. In such examples, the sensor 112 can obtain data from one or more computing devices associated with the first network 104 (e.g., one computing device up to and including all of the computing devices connected to the first network 104), such as one or more of the foreign devices 132, one or more of the local managed devices 134, one or more of the rogue devices 136, etc., and/or a combination thereof. In response to setting the sensor to the active mode at block 410, the machine readable instructions 400 conclude.

If, at block 404, the managed device detector 102, 202 determines that the network does not correspond to the whitelisted network(s), then, at block 406, the managed device detector 102, 202 determines whether the network corresponds to blacklisted network(s). For example, the network comparator 118 of FIG. 1 and/or the network comparator 218 of FIG. 2 can determine that the first network 104 corresponds to a blacklisted network in response to determining that one or more portions of network configuration information associated with the first network 104 are included in the network configuration blacklist 152 of FIGS. 1 and/or 2. In other examples, the network comparator 118 of FIG. 1 and/or the network comparator 218 of FIG. 2 can determine that the first network 104 does not correspond to a blacklisted network in response to determining that one or more portions of network configuration information associated with the first network 104 are not included in the network configuration blacklist 152 of FIGS. 1 and/or 2.

If, at block 406, the managed device detector 102, 202 determines that the network does not correspond to the blacklisted network(s), control proceeds to block 410 to set the sensor 112 to the active mode.

If, at block 406, the managed device detector 102, 202 determines that the network corresponds to the blacklisted network(s), then, at block 408, the managed device detector 102, 202 sets the sensor 112 to the passive mode. For example, the network comparator 118, 218 can notify the sensor controller 116 that the network configuration blacklist 152 includes the network configuration information associated with the first network 104. In response to the notification, the sensor controller 116 can adjust the sensor 112 to the passive mode. For example, the sensor 112 may ping (e.g., periodically ping) the first network 104 to determine whether the network configuration information changes indicative of the managed device detector 102, 202 connecting to a different network than the first network 104. In response to setting the sensor to the passive mode at block 408, the machine readable instructions 400 of FIG. 4 conclude.

Figure 5:
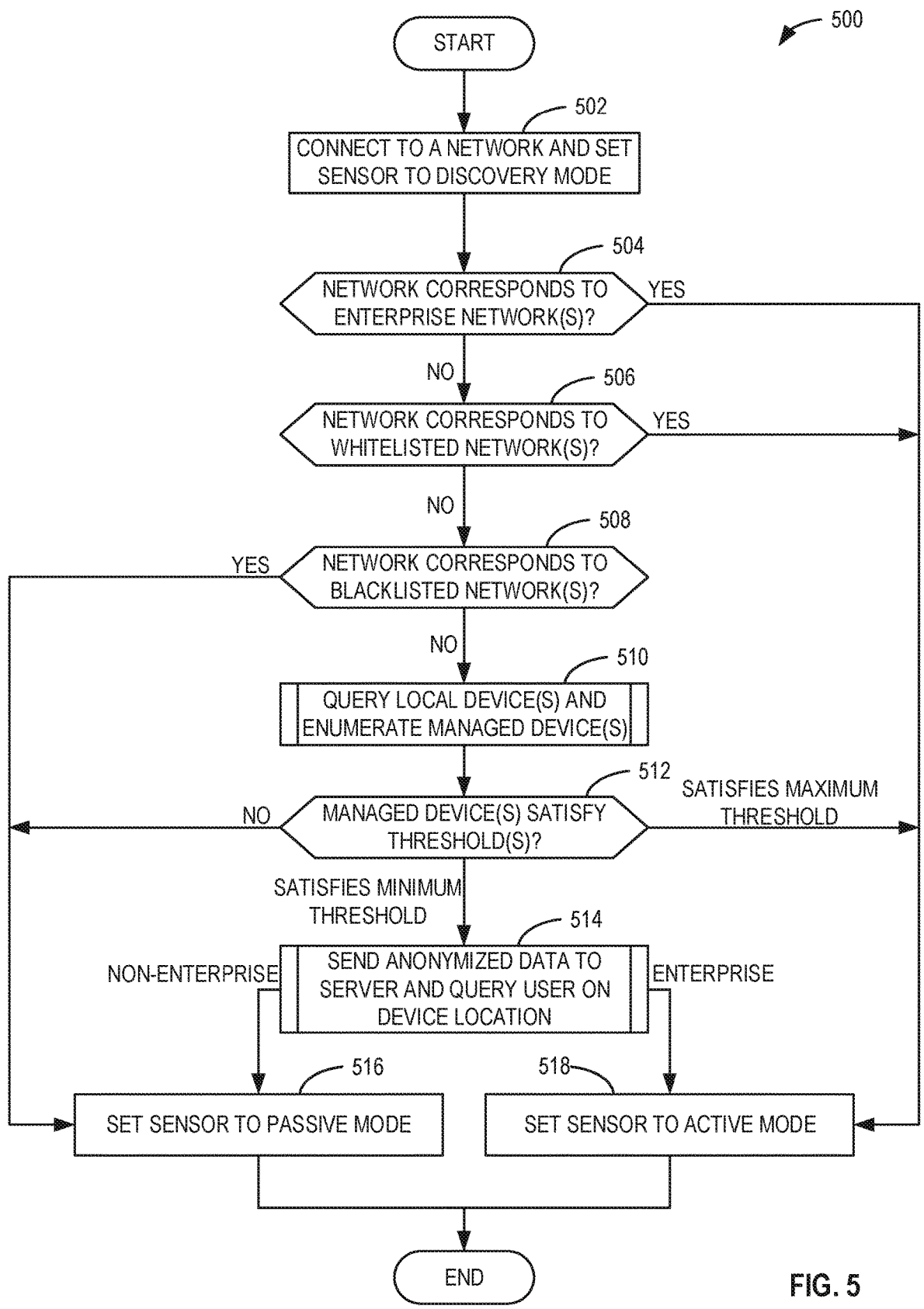
FIG. 5 is a flowchart representative of example machine readable instructions that may be executed to implement the example managed device detector of FIGS. 2 and/or 3 to control an example sensor in response to a classification of the example network of FIGS. 1, 2, and/or 3.

FIG. 5 is a flowchart representative of example machine readable instructions 500 that may be executed to implement the managed device detector 202 of FIGS. 2 and/or 3 to control the sensor 112 of FIGS. 1 and/or 2 in response to a classification of the first network 104 of FIGS. 1, 2, and/or 3. The machine readable instructions 500 of FIG. 5 begin at block 502, at which the managed device detector 202 connects to a network and sets a sensor to discovery mode. For example, the sensor controller 116 of FIGS. 1 and/or 2 can instruct the sensor 112 to connect to the first network 104 and operate in the discovery mode.

At block 504, the managed device detector 202 determines whether the network corresponds to enterprise network(s). For example, the network comparator 218 of FIG. 2 can identify the network configuration information of the first network 104. In such examples, the network comparator 218 can determine whether the enterprise network configuration 254 of FIG. 2 includes the network configuration information of the first network 104. For example, the network comparator 218 can determine that the first network 104 corresponds to an enterprise network in response to determining that one or more portions of network configuration information associated with the first network 104 are included in the enterprise network configuration 254. In other examples, the network comparator 218 can determine that the first network 104 does not correspond to an enterprise network in response to determining that one or more portions of network configuration information associated with the first network 104 are not included in the enterprise network configuration 254.

If, at block 504, the managed device detector 202 determines the network does correspond to the enterprise network(s), control proceeds to block 518. At block 518, the managed device detector 202 sets the sensor to active mode. For example, the network comparator 218 can invoke the sensor controller 116 to set and/or adjust the sensor 112 to the active mode. In such examples, the sensor 112 can obtain data from one or more computing devices associated with the first network 104 (e.g., one computing device up to and including all of the computing devices connected to the first network 104), such as one or more of the foreign devices 132, one or more of the local managed devices 134, one or more of the rogue devices 136, etc., and/or a combination thereof. In response to setting and/or adjusting the sensor 112 to the active mode at block 518, the machine readable instructions 500 of FIG. 5 conclude.

If, at block 504, the managed device detector 202 determines the network does not correspond to one of the enterprise network(s), control proceeds to block 506. At block 506, the managed device detector 202 determines whether the network corresponds to whitelisted network(s). For example, the network comparator 218 can identify the network routing configuration of the network 104. In such examples, the network comparator 218 can determine whether the network configuration whitelist 150 of FIG. 2 includes the network configuration information of the network 104. For example, the network comparator 218 can determine that the first network 104 corresponds to a whitelisted network in response to determining that one or more portions of the network configuration information associated with the first network 104 are included in the network configuration whitelist 150. In other examples, the network comparator 218 can determine that the first network 104 does not correspond to a whitelisted network in response to determining that one or more portions of network configuration information associated with the first network 104 are not included in the network configuration whitelist 150.

If, at block 506, the managed device detector 202 determines that the network does correspond to the whitelisted network(s), control proceeds to block 518. If, at block 506, the managed device detector 202 determines that the network does not correspond to the whitelisted network(s), control proceeds to block 508. At block 508, the managed device detector 202 determines whether the network corresponds to blacklisted network(s). For example, the network comparator 218 can determine that the first network 104 corresponds to a blacklisted network in response to determining that one or more portions of the network configuration information associated with the first network 104 are included in the network configuration blacklist 152 of FIGS. 1 and/or 2. In other examples, the network comparator 218 can determine that the first network 104 does not correspond to a blacklisted network in response to determining that one or more portions of the network configuration information associated with the first network 104 are not included in the network configuration blacklist 152.

If, at block 508, the managed device detector 202 determines that the network does correspond to the blacklisted network(s), control proceeds to block 516. At block 516, the managed device detector 202 sets the sensor 112 to the passive mode. For example, the network comparator 218 can invoke the sensor controller 116 to set and/or otherwise adjust the sensor 112 to the passive mode. In response to setting the sensor 112 to the passive mode at block 516, the machine readable instructions 500 of FIG. 5 conclude.

If, at block 508, the managed device detector 202 determines that the network does not correspond to the blacklisted network(s), control proceeds to block 510. At block 510, the managed device detector 202 queries local device(s) and enumerates managed device(s). For example, the neighbor comparator 220 of FIG. 2 can transmit a discovery packet based on an encryption key via the first network 104 to the local device(s) (e.g., the foreign device(s) 132 of FIG. 2, the local managed device(s) 134 of FIG. 2, the rogue device(s) 136 of FIG. 2, etc.) communicatively coupled to the first network 104. In such examples, the neighbor comparator 220 can enumerate the number of the local device(s) that respond to the discovery packet with a correct encryption key. An example process that may be used to implement block 510 is described below in connection with FIG. 6.

At block 512, the managed device detector 202 determines whether the managed device(s) satisfy threshold(s). For example, the neighbor comparator 220 can determine that the total number of the local managed device(s) 134 does not satisfy the first threshold (e.g., a minimum threshold) or the second threshold (e.g., a maximum threshold). In other examples, the neighbor comparator 220 can determine that the total number of the local managed device(s) 134 satisfies the first threshold but does not satisfy the second threshold. In yet other examples, the neighbor comparator 220 can determine that the total number of the local managed device(s) 134 satisfies the second threshold.

If, at block 512, the managed device detector 202 determines that the managed device(s) do not satisfy the first threshold, control proceeds to block 516. If, at block 512, the managed device detector 202 determines that the managed device(s) satisfy the second threshold, control proceeds to block 518.

If, at block 512, the managed device detector 202 determines that the number of local managed device(s) satisfies the first threshold but does not satisfy the second threshold, control proceeds to block 514. At block 514, the managed device detector 202 sends anonymized data to a server and query a user on a device location. For example, the sensor 112 can collect local device behavior data from the local device(s) via the first network 104. The sensor 112 can anonymize the local device behavior data collected from the local device(s). The sensor 112 can transmit the anonymous data to the central server 210 of FIG. 2. In such examples, the sensor controller 116 can launch a user interface on a respective one of the computing devices 206a-c and query a user on the classification of the first network 104 via the user interface. An example process that may be used to implement block 514 is described below in connection with FIG. 7.

If, at block 514, the user provides a response indicative of a non-enterprise classification of the first network 104, control proceeds to block 516. If, at block 514, the user provides a response indicative of an enterprise classification of the first network 104, control proceeds to block 518. In response to setting the sensor 112 to the passive mode at block 516 or in response to setting the sensor 112 to the active mode at block 518, the machine readable instructions 500 of FIG. 5 conclude.

Figure 6:
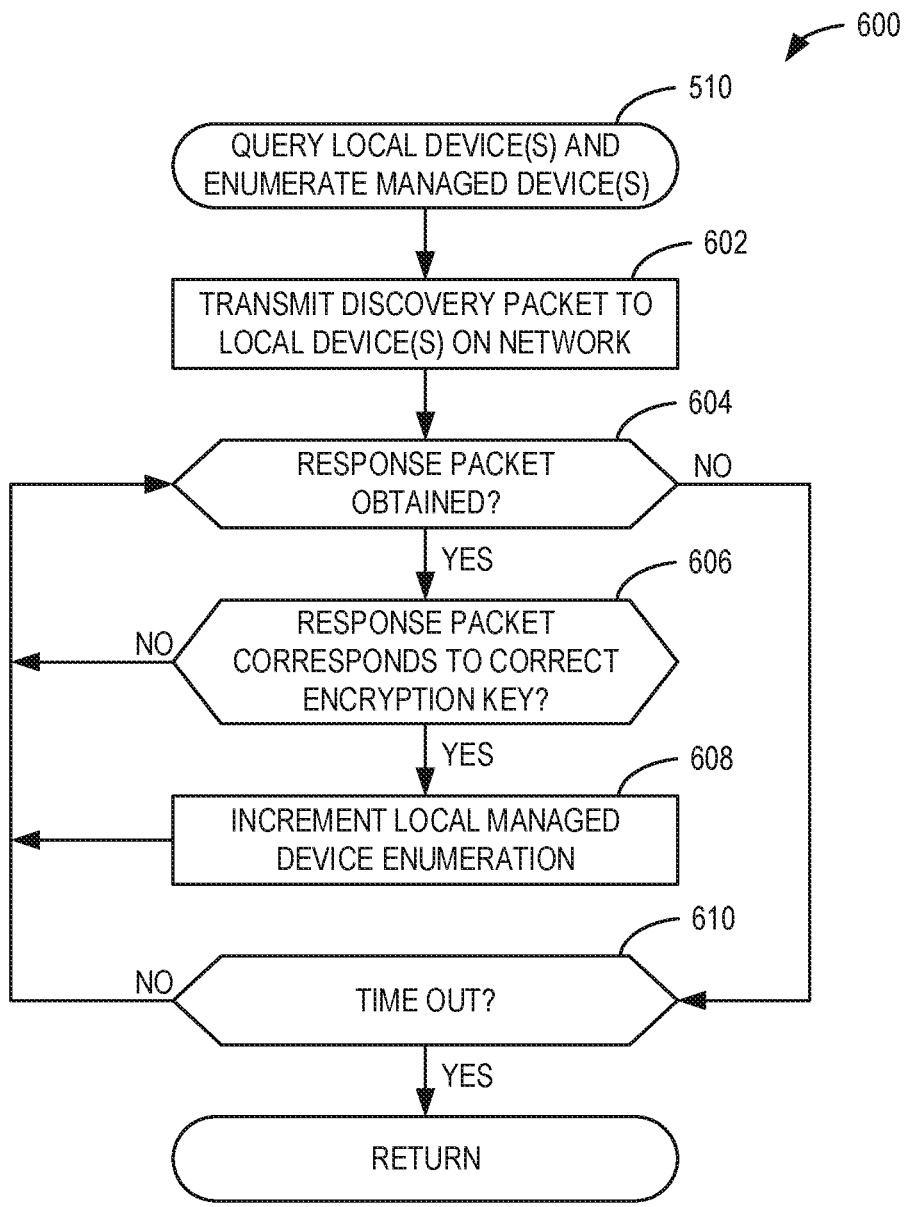
FIG. 6 is a flowchart representative of example machine readable instructions that may be executed to implement the example managed device detector of FIGS. 2 and/or 3 to query local device(s) and enumerate managed device(s).

FIG. 6 is a flowchart representative of example machine readable instructions 600 that may be executed to implement the managed device detector 202 of FIGS. 2 and/or 3 to query local device(s) and enumerate managed device(s). The machine readable instructions 600 of FIG. 6 may be used to implement block 510 of FIG. 5. The machine readable instructions 600 of FIG. 6 begin at block 602, at which the managed device detector 202 transmits a discovery packet to the local device(s) on the first network 104 of FIGS. 1, 2, and/or 3. For example, the neighbor comparator 220 of FIG. 2 can transmit a discovery packet signed by an encryption key to the local device(s) communicatively coupled to the first network 104. In such examples, the neighbor comparator 220 can generate the encryption key, obtain the encryption key from a server, etc.

At block 604, the managed device detector 202 determines whether a response packet has been obtained. For example, the sensor 112 can receive a response (e.g., a response packet) from the local device(s) (e.g., the foreign device(s) 132 of FIG. 2, the local managed device(s) 134 of FIG. 2, etc.).

If, at block 604, the managed device detector 202 determines that a response packet has been obtained, control proceeds to block 606. At block 606, the managed device detector 202 determines whether the response packet corresponds to a correct encryption key. For example, the neighbor comparator 220 of FIG. 2 can compare the encryption key associated with the response to the initial encryption key and determine whether the response encryption key is the correct or expected encryption key based on the comparison. In other examples, the neighbor comparator 220 can compare the response encryption key to the initial encryption key and determine that the response encryption key is different from the initial encryption key and, thus, determine that the response encryption key is not the correct or the expected encryption key based on the comparison.

If, at block 606, the managed device detector 202 determines the response packet does not correspond to the correct response encryption key, control returns to block 604 to determine whether another response packet has been obtained. If, at block 606, the managed device detector 202 determines the response packet corresponds to the correct encryption key, control proceeds to block 608.

At block 608, the managed device detector 202 increments the number of local managed device(s) enumeration. For example, the neighbor comparator 220 can enumerate the number of the local managed device(s) 134 by increment a total number of the local managed device(s) 134 communicatively coupled to the first network 104. In response to incrementing the local managed device enumeration at block 608, control returns to block 604 to determine whether another response packet has been obtained.

If, at block 604, the managed device detector 202 determines that a response packet has not been obtained, control proceeds to block 610. At block 610, the managed device detector 202 determines whether a time out has occurred. For example, the manage device detector 202 may determine that a timer corresponding to a time out operation has not elapsed and the machine readable instructions 600 of FIG. 6 can iterate. In other examples, the manage device detector 202 can determine that the timer has elapsed and, in response to the elapsing of the timer, the machine readable instructions 600 of FIG. 6 return to block 512 of the machine readable instructions 500 of FIG. 5. If, at block 610, the managed device detector 202 does not time out, control returns to block 604 to determine whether another response packet has been obtained.

Figure 7:
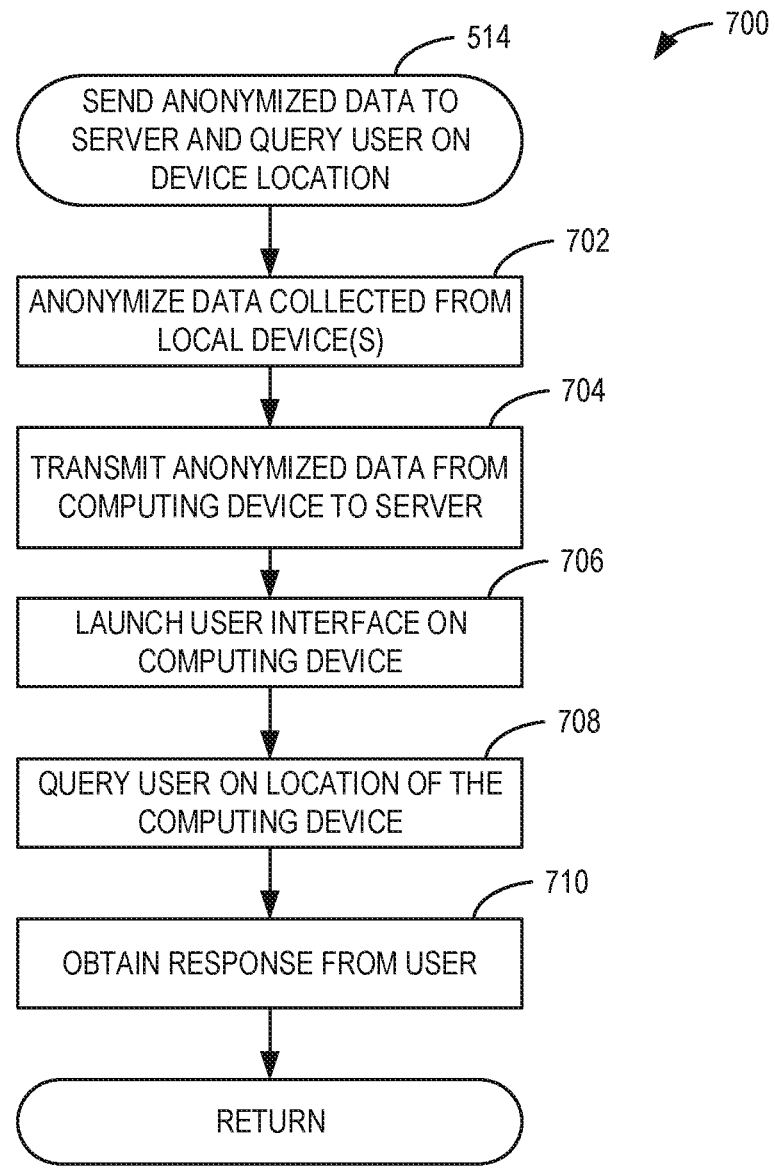
FIG. 7 is a flowchart representative of example machine readable instructions that may be executed to implement the example managed device detector of FIGS. 2 and/or 3 to send anonymized data to the example central server of FIG. 2 and query a user on a device location.

FIG. 7 is a flowchart representative of example machine readable instructions 700 that may be executed to implement the managed device detector 202 of FIGS. 2 and/or 3 to send anonymized data to the central server 210 of FIG. 2 and query a user on a device location. The machine readable instructions 700 of FIG. 7 may be used to implement block 514 of FIG. 5. The machine readable instructions 700 of FIG. 7 begin at block 702, at which the managed device detector 202 anonymizes data collected from local device(s). For example, the sensor 112 of FIGS. 1 and/or 2 can anonymize the data collected from the local device(s) (e.g., the foreign device(s) 132 of FIG. 2, the local managed device(s) 134 of FIG. 2, the rogue device(s) 136 of FIG. 2, etc.).

At block 704, the managed device detector 202 transmits the anonymized data to a server. For example, the sensor 112 can transmit the anonymized data to the central server 210 via the second network 108 of FIGS. 1 and/or 2.

At block 706, the managed device detector 202 launches a user interface on a respective one of the computing devices 206*a-c* of FIG. 2. For example, the managed device detector 202 can open a user interface on a display of the respective one of the computing devices 206*a-c* by executing an application or other executable program on one of the computing devices 206*a-c*.

At block 708, the managed device detector 202 queries a user on a location of the respective one of the computing devices 206*a-c*. For example, the managed device detector 202 can display a text data field, a multiple-choice data field, one or more clickable buttons representative of locations, etc., that can obtain a response from a user of the respective one of the computing devices 206*a-c*.

At block 710, the managed device detector 202 obtains a response from the user. For example, the managed device detector 202 can obtain a response from the user about the location of the computing device 206*a-c*. In such examples, the managed device detector 202 can obtain a response (e.g., from the user) representative of a classification (e.g., an enterprise network, a non-enterprise network, etc.) of the first network 104. In response to obtaining the response from the user at block 710, the machine readable instructions 700 of FIG. 7 return to block 516 of the machine readable instructions 500 of FIG. 5.

Figure 8:
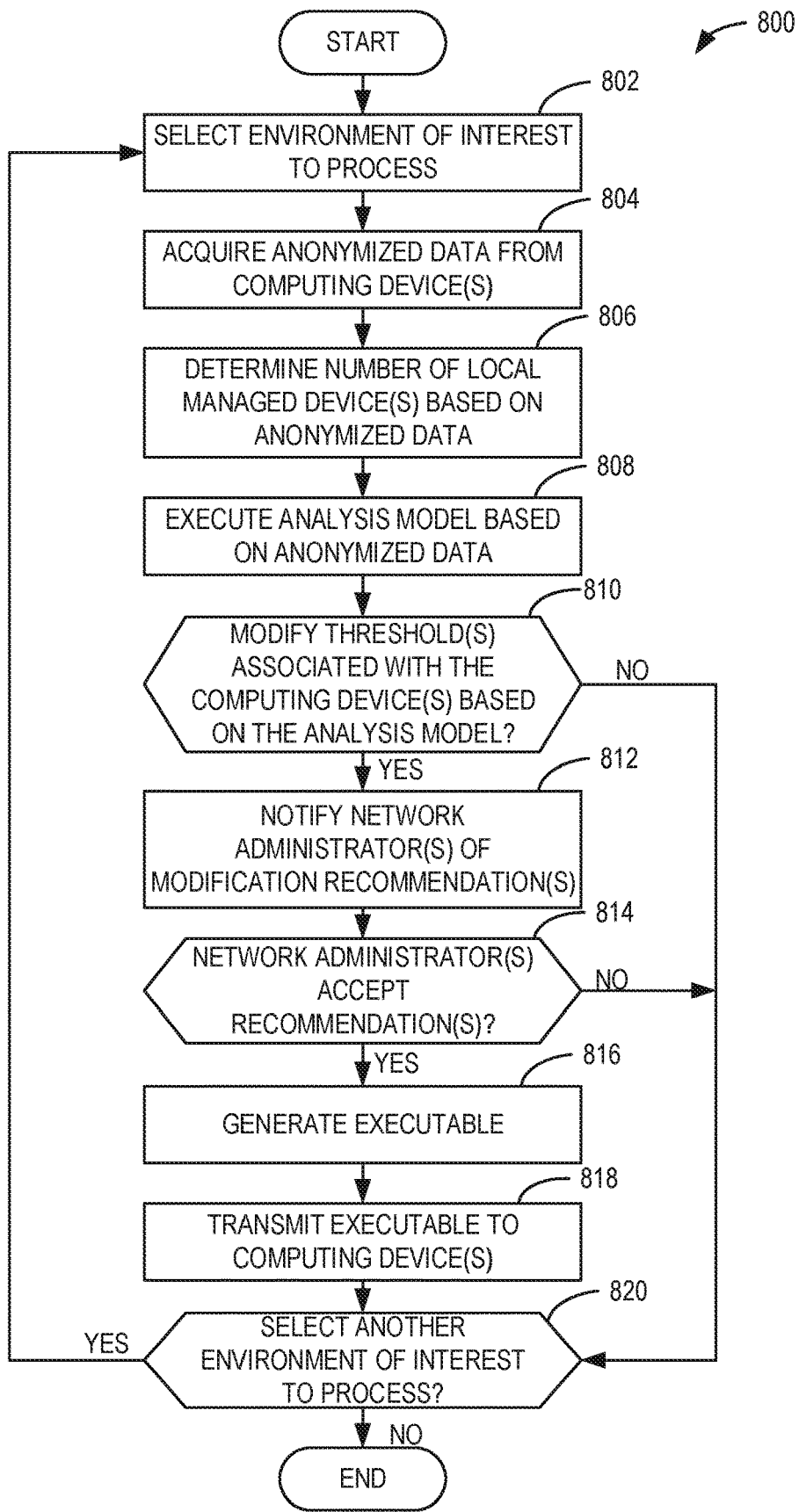
FIG. 8 is a flowchart representative of example machine readable instructions that may be executed to implement the example central server of FIG. 2 to generate an example executable to update the example managed device detector of FIGS. 2 and/or 3.
Figure 11:
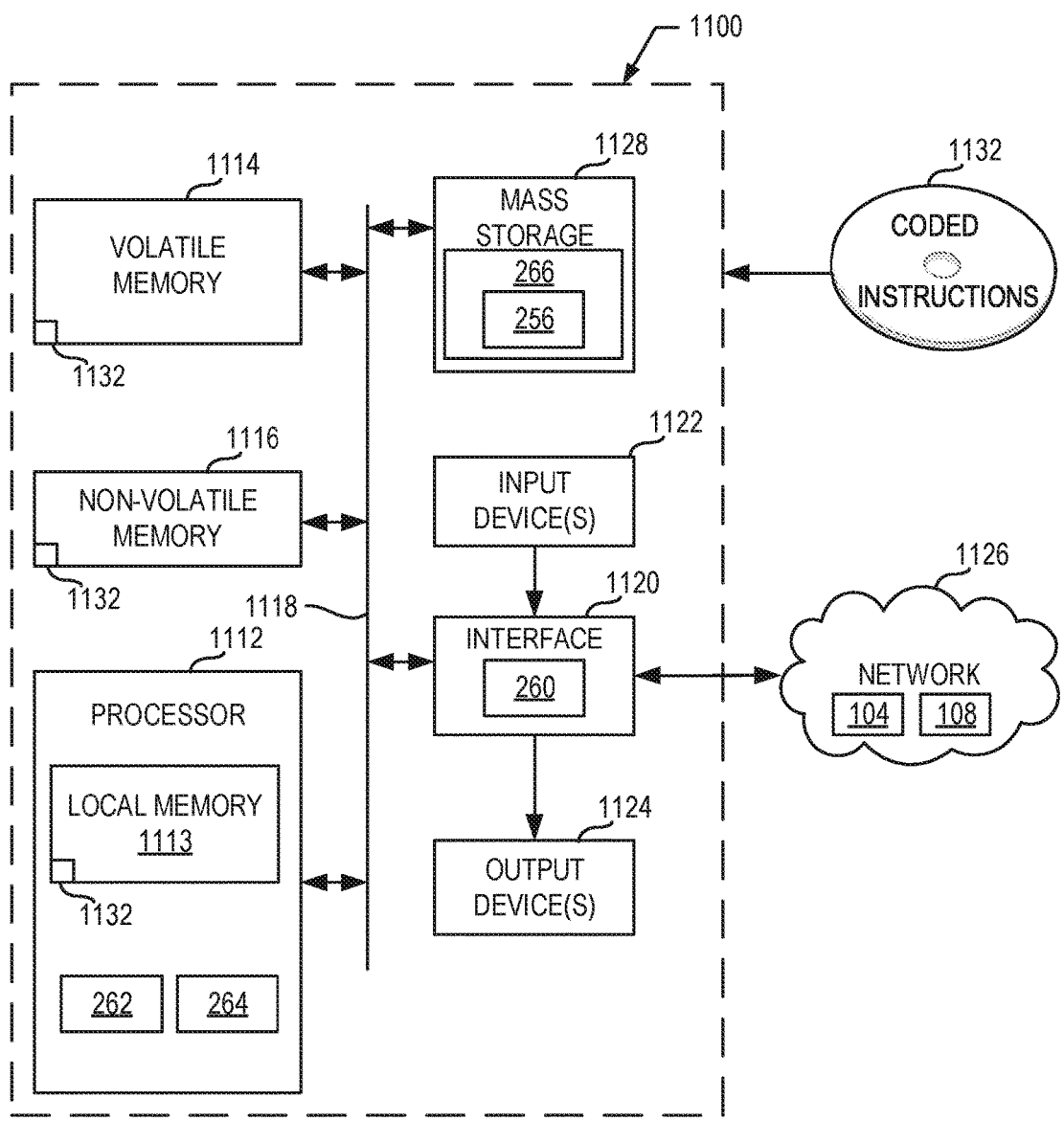
FIG. 11 is a block diagram representation of an example processing platform structured to execute the example machine readable instructions of FIG. 8 to implement the example central server of FIG. 2.

A flowchart representative of example hardware logic, machine readable instructions, hardware implemented state machines, and/or any combination thereof for implementing the example central server 210 of FIG. 2 is shown in FIG. 8. The machine readable instructions may be an executable program or portion of an executable program for execution by a computer processor such as the processor 1112 of FIG. 11 shown in the example processor platform 1100 of FIG. 11 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112 of FIG. 11, but the entire program and/or parts thereof could alternatively be executed by a device other than the processor 1112 of FIG. 11 embodied in firmware or dedicated hardware. Further, although the example program is described with reference to the flowchart illustrated in FIG. 8, many other methods of implementing the example central server 210 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 8 may be implemented using executable instructions (e.g., computer and/or machine readable instructions) stored on a non-transitory computer and/or machine readable medium such as a hard disk drive, a flash memory, a read-only memory, a CD, a DVD, a cache, a random-access memory, and/or any other storage device or storage disk in which information is stored for any duration (e.g., for extended time periods, permanently, for brief instances, for temporarily buffering, and/or for caching of the information).

FIG. 8 is a flowchart representative of example machine readable instructions 800 that may be executed to implement the central server 210 of FIG. 2 to generate an executable to update one or more instances of the managed device detector 202 of FIG. 2. The machine readable instructions 800 of FIG. 8 begin at block 802, at which the central server 210 selects an environment of interest to process. For example, the network communicator 260 of FIG. 2 can select the first network 104 of FIGS. 1, 2, and/or 3, and/or, more generally, the network classification system 200 of FIG. 2 to process.

At block 804, the central server 210 acquires anonymized data from computing device(s). For example, network communicator 260 can receive a request including an anonymized version of one or more portions of the local device behavior data 256 from one or more of the computing devices 206*a-c* via the second network 108 of FIGS. 1 and/or 2.

At block 806, the central server 210 determines a number of local managed device(s) based on the anonymized data. For example, the data analyzer 262 of FIG. 2 can analyze the anonymized data received from the one or more of the computing devices 206*a-c* and determine the number of the local device(s) that are managed. In such examples, the data analyzer 262 can analyze the anonymous data for programs, behavior search history, activity, etc., that implies and/or otherwise is indicative as being associated with an enterprise managed device.

At block 808, the central server 210 executes an analysis model based on the anonymized data. For example, the data analyzer 262 can analyze the anonymized local device behavior data 256 and historical or previously obtained anonymized local device behavior data to determine an average, typical, and/or otherwise expected number of local managed device(s) for a network such as the first network 104.

At block 810, the central server 210 determines whether to modify the thresholds associated with the computing device(s) based on the analysis model. For example, the data analyzer 262 can determine that the average amount of the local managed device(s) 134 does not satisfy the second threshold. In such examples, the data analyzer 262 can invoke the executable generator 264 of FIG. 2 to generate a new executable for the managed device detector 202 that, when executed, uses a different first threshold and/or a different second threshold.

If, at block 810, the data analyzer 262 does not determine a modification to be necessary, control proceeds to block 820 to determine whether to select another environment of interest to process. If, at block 810, the data analyzer 262 determines a modification to be necessary, control proceeds to block 812. At block 812, the central server 210 notifies network administrator(s) (e.g., network administrator, an IT administrator, a system administrator, etc.) of the modification recommendation(s). For example, the network communicator 260 can transmit one or more data packets to a computing device associated with the administrator. In such examples, the one or more data packets can correspond to an alert, a notification, an instruction to display a user interface, a direction to display such an alert or notification, etc., where the alert, the notification, etc., include the modification recommendation(s).

At block 814, the central server 210 determines whether the network administrator(s) accepted the modification recommendation(s). For example, the executable generator 264 can query the administrator whether to accept the modification recommendation(s). In other examples, the executable generator 264 can determine to accept the modification recommendation(s). In yet other examples, the executable generator 264 can determine to decline the modification recommendation(s).

If, at block 814, the central server 210 determines that the network administrator(s) did not accept the modification recommendation(s), control proceeds to block 820. If, at block 814, the central server 210 determines that the network administrator(s) accepted the modification recommendation(s), control proceeds to block 816. At block 816, the central server 210 generates an executable. For example, the executable generator 264 can generate an executable corresponding to a new or updated version of the managed device detector 202, where the executable includes instructions to update at least one of the first threshold or second threshold based on the modification recommendation(s).

At block 818, the central server 210 transmits the executable to the computing device(s). For example, the network communicator 260 can push, distribute, and/or otherwise distribute the executable to one or more instances of the managed device detector 202 (e.g., to one or more instances of the computing device(s) 206*a-c*). In such examples, the network communicator 260 can transmit network communications including the new version of the manage device detector 202 to the one or more instances of the computing device(s) 206*a-c* via the second network 108.

At block 820, the central server 210 determines whether to select another environment of interest to process. For example, the network communicator 260 can determine whether a request has been obtained from another instance of the sensor 112, a different network, etc. If at block 820, the central server 210 determines that there is another environment of interest to process, control returns to block 802 to select another environment of interest to process. If, at block 820, the central server 210 determines that there is not another environment of interest to process, the machine readable instructions 800 of FIG. 8 conclude.

FIG. 9 is a block diagram of an example processor platform 900 structured to execute the instructions of FIG. 4 to implement the example managed device detector 102 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example controller 114 of FIG. 1, the example sensor controller 116 of FIGS. 1 and/or 2, and the example network comparator 118 of FIG. 1.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by SDRAM, DRAM, RDRAM®, and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 920 implements the example sensor 112 of FIGS. 1 and/or 2. In this example, the network 926 implements the first example network 104 of FIGS. 1, 2, and/or 3 and the second example network 108 of FIGS. 1 and/or 2.

The processor platform 900 of the illustrated example also includes one or more mass storage devices 928 for storing software and/or data. Examples of such mass storage devices 928 include floppy disk drives, hard drive disks, CD drives, Blu-ray disk drives, redundant array of independent disks (RAID) systems, and DVD drives. In this example, the one or more mass storage devices 928 implement the example database 144 of FIG. 1, the example network configuration whitelist 150 of FIGS. 1 and/or 2, and the network configuration blacklist 152 of FIGS. 1 and/or 2.

The machine executable instructions 932 of FIG. 4 may be stored in the mass storage device 928, in the volatile memory 914, in the non-volatile memory 916, and/or on a removable non-transitory computer readable storage medium such as a CD or DVD.

FIG. 10 is a block diagram of an example processor platform 1000 structured to execute the instructions of FIGS. 4-7 to implement the example managed device detector 202 of FIGS. 2 and/or 3. The processor platform 1000 can be, for example, a server, a personal computer, a workstation, a self-learning machine (e.g., a neural network), a mobile device (e.g., a cell phone, a smart phone, a tablet such as an iPad™), a PDA, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example sensor controller 116 of FIGS. 1 and/or 2, the example controller 214 of FIG. 2, the example network comparator 218 of FIG. 2, and the example neighbor comparator 220 of FIG. 2.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by SDRAM, DRAM, RDRAM®, and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a USB, a Bluetooth® interface, a NFC interface, and/or a PCI express interface.

In the illustrated example, one or more input devices 1022 are connected to the interface circuit 1020. The input device(s) 1022 permit(s) a user to enter data and/or commands into the processor 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuit 1020 of the illustrated example. The output devices 1024 can be implemented, for example, by display devices (e.g., a LED, an OLED, a LCD, a CRT display CRT, an IPS display, a touchscreen, etc.), a tactile output device, a printer, and/or speaker. The interface circuit 1020 of the illustrated example, thus, typically includes a graphics driver card, a graphics driver chip, and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a DSL connection, a telephone line connection, a coaxial cable system, a satellite system, a line-of-site wireless system, a cellular telephone system, etc. In this example, the interface circuit 1020 implements the example sensor 112 of FIGS. 1 and/or 2. In this example, the network 1026 implements the first example network 104 of FIGS. 1, 2, and/or 3 and the second example network 108 of FIGS. 1 and/or 2.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and DVD drives. In this example, the one or more mass storage devices 1028 implement the example database 244 of FIG. 2, the example network configuration whitelist 150 of FIGS. 1 and/or 2, the example network configuration blacklist 152 of FIGS. 1 and/or 2, the example enterprise network configuration 254 of FIG. 2, and the example local device behavior data 256 of FIG. 2.

The machine executable instructions 1032 of FIGS. 4-7 may be stored in the mass storage device 1028, in the volatile memory 1014, in the non-volatile memory 1016, and/or on a removable non-transitory computer readable storage medium such as a CD or DVD.

FIG. 11 is a block diagram of an example processor platform 1100 structured to execute the instructions of FIG. 8 to implement the example central server 210 of FIG. 2. The processor platform 1100 can be, for example, a server, a personal computer, a workstation, a self-learning machine (e.g., a neural network), or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1112 implements the example data analyzer 262 of FIG. 2 and the example executable generator 264 of FIG. 2.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by SDRAM, DRAM, RDRAM®, and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a USB, a Bluetooth® interface, a NFC interface, and/or a PCI express interface.

In the illustrated example, one or more input devices 1122 are connected to the interface circuit 1120. The input device(s) 1122 permit(s) a user to enter data and/or commands into the processor 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuit 1120 of the illustrated example. The output devices 1124 can be implemented, for example, by display devices (e.g., a LED, an OLED, a LCD, a CRT display, an IPS display, a touchscreen, etc.), a tactile output device, a printer, and/or speaker. The interface circuit 1120 of the illustrated example, thus, typically includes a graphics driver card, a graphics driver chip, and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a DSL connection, a telephone line connection, a coaxial cable system, a satellite system, a line-of-site wireless system, a cellular telephone system, etc. In this example, the interface circuit 1120 implements the example network communicator 260 of FIG. 2. In this example, the network 1126 implements the first example network 104 of FIGS. 1, 2, and/or 3 and the second example network 108 of FIGS. 1 and/or 2.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and DVD drives. In this example, the one or more mass storage devices 1128 implement the example database 266 of FIG. 2 and the local device behavior data 256 of FIG. 2.

The machine executable instructions 1132 of FIG. 8 may be stored in the mass storage device 1128, in the volatile memory 1114, in the non-volatile memory 1116, and/or on a removable non-transitory computer readable storage medium such as a CD or DVD.

Example methods, apparatus, systems, and articles of manufacture for dynamic network classification using authenticated neighbor detection are disclosed herein.

Further examples and combinations thereof include the following:

Example 1 includes an apparatus for dynamic network classification, the apparatus comprising a network comparator to determine whether a network to be connected by a computing device is a managed network based on network configuration information associated with the network, in response to determining the network is not a managed network, a neighbor comparator to determine a number of different computing devices on the network that are managed computing devices, and in response to determining that the number of the managed computing devices satisfies a threshold, a sensor controller to invoke a sensor of the computing device to obtain data from computing devices associated with the network, the computing devices including the managed computing devices.

Example 2 includes the apparatus of example 1, wherein the network comparator is to compare the network configuration information to enterprise network configuration information, and in response to determining that the network is the managed network based on the comparison, invoke the sensor to obtain the data.

Example 3 includes the apparatus of example 1, wherein the network comparator is to compare the network configuration information to a whitelist of network configuration information, and in response to determining that the network is the managed network based on the comparison, invoke the sensor to obtain the data.

Example 4 includes the apparatus of example 1, wherein the network comparator is to compare the network configuration information to a blacklist of network configuration information, and in response to determining that the network is not the managed network based on the comparison, instruct the sensor not to obtain the data.

Example 5 includes the apparatus of example 1, wherein the threshold is a first threshold, and the neighbor comparator is to obtain a first encryption key, query the different computing devices on the network with a discovery packet based on the first encryption key, enumerate a first set of the different computing devices on the network that respond with a respective first response packet based on the first encryption key, enumerate a second set of the different computing devices on the network that do not respond to the discovery packet, enumerate a third set of the different computing devices on the network that respond with a respective second response packet based on a second encryption key that is different from the first encryption key, compare the number of the different computing devices in the first set to the first threshold and a second threshold, and determine a type of the data to be collected from the computing devices based on the comparisons.

Example 6 includes the apparatus of example 1, wherein the threshold is a first threshold, and the sensor controller is to launch a user interface on the computing device when a number of the managed computing devices satisfies a second threshold but does not satisfy the first threshold, the first threshold representative of a first quantity of the managed computing devices, the second threshold representative of a second quantity of the managed computing devices, the first quantity greater than the second quantity, invoke the sensor to obtain the data when the user interface obtains a first response indicative of the network corresponding to the managed network, and instruct the sensor to not obtain the data when the user interface obtains a second response indicative of the network corresponding to an unmanaged network.

Example 7 includes the apparatus of example 1, wherein the threshold is a first threshold, and the sensor controller is to instruct the sensor to obtain local device behavior data from the different computing devices on the network when the number of the managed computing devices satisfies a second threshold but does not satisfy the first threshold, the first threshold representative of a first quantity of the managed computing devices, the second threshold representative of a second quantity of the managed computing devices, the first quantity greater than the second quantity, instruct the sensor to anonymize the local device behavior data to generate anonymized local device behavior data, and instruct the sensor to transmit the anonymized local device behavior data to a server.

Example 8 includes a non-transitory computer readable storage medium comprising instructions that, when executed, cause a computing device to at least determine whether a network to be connected by the computing device is a managed network based on network configuration information associated with the network, in response to determining the network is not a managed network, determine a number of different computing devices on the network that are managed computing devices, and in response to determining that the number of the managed computing devices satisfies a threshold, invoke a sensor of the computing device to obtain data from computing devices associated with the network, the computing devices including the managed computing devices.

Example 9 includes the non-transitory computer readable storage medium of example 8, wherein the instructions, when executed, cause the computing device to compare the network configuration information to enterprise network configuration information, and in response to determining that the network is the managed network based on the comparison, invoke the sensor to obtain the data.

Example 10 includes the non-transitory computer readable storage medium of example 8, wherein the instructions, when executed, cause the computing device to compare the network configuration information to a whitelist of network configuration information, and in response to determining that the network is the managed network based on the comparison, invoke the sensor to obtain the data.

Example 11 includes the non-transitory computer readable storage medium of example 8, wherein the instructions, when executed, cause the computing device to compare the network configuration information to a blacklist of network configuration information, and in response to determining that the network is not the managed network based on the comparison, instruct the sensor not to obtain the data.

Example 12 includes the non-transitory computer readable storage medium of example 8, wherein the threshold is a first threshold, and the instructions, when executed, cause the computing device to obtain a first encryption key, query the different computing devices on the network with a discovery packet based on the first encryption key, enumerate a first set of the different computing devices on the network that respond with a respective first response packet based on the first encryption key, enumerate a second set of the different computing devices on the network that do not respond to the discovery packet, enumerate a third set of the different computing devices on the network that respond with a respective second response packet based on a second encryption key that is different from the first encryption key, compare the number of the different computing devices in the first set to the first threshold and a second threshold, and determine a type of the data to be collected from the computing devices based on the comparisons.

Example 13 includes the non-transitory computer readable storage medium of example 8, wherein the threshold is a first threshold, and the instructions, when executed, cause the computing device to launch a user interface on the computing device when a number of the managed computing devices satisfies a second threshold but does not satisfy the first threshold, the first threshold representative of a first quantity of the managed computing devices, the second threshold representative of a second quantity of the managed computing devices, the first quantity greater than the second quantity, invoke the sensor to obtain the data when the user interface obtains a first response indicative of the network corresponding to the managed network, and instruct the sensor to not obtain the data when the user interface obtains a second response indicative of the network corresponding to an unmanaged network.

Example 14 includes the non-transitory computer readable storage medium of example 8, wherein the threshold is a first threshold, and the instructions, when executed, cause the computing device to obtain local device behavior data from the different computing devices on the network when the number of the managed computing devices satisfies a second threshold but does not satisfy the first threshold, the first threshold representative of a first quantity of the managed computing devices, the second threshold representative of a second quantity of the managed computing devices, the first quantity greater than the second quantity, anonymize the local device behavior data to generate anonymized local device behavior data, and transmit the anonymized local device behavior data to a server.

Example 15 includes a method for dynamic network classification, the method comprising determining whether a network to be connected by a computing device is a managed network based on network configuration information associated with the network, in response to determining the network is not a managed network, determine a number of different computing devices on the network that are managed computing devices, and in response to determining that the number of the managed computing devices satisfies a threshold, invoking a sensor of the computing device to obtain data from computing devices associated with the network, the computing devices including the managed computing devices.

Example 16 includes the method of example 15, further including comparing the network configuration information to enterprise network configuration information, and in response to determining that the network is the managed network based on the comparison, invoking the sensor to obtain the data.

Example 17 includes the method of example 15, further including comparing the network configuration information to a whitelist of network configuration information, and in response to determining that the network is the managed network based on the comparison, invoking the sensor to obtain the data.

Example 18 includes the method of example 15, further including comparing the network configuration information to a blacklist of network configuration information, and in response to determining that the network is not the managed network based on the comparison, instructing the sensor not to obtain the data.

Example 19 includes the method of example 15, wherein the threshold is a first threshold, and further including obtaining a first encryption key, querying the different computing devices on the network with a discovery packet based on the first encryption key, enumerating a first set of the different computing devices on the network that respond with a respective first response packet based on the first encryption key, enumerating a second set of the different computing devices on the network that do not respond to the discovery packet, enumerating a third set of the different computing devices on the network that respond with a respective second response packet based on a second encryption key that is different from the first encryption key, comparing the number of the different computing devices in the first set to the first threshold and a second threshold, and determining a type of the data to be collected from the computing devices based on the comparisons.

Example 20 includes the method of example 15, wherein the threshold is a first threshold, and further including launching a user interface on the computing device when a number of the managed computing devices satisfies a second threshold but does not satisfy the first threshold, the first threshold representative of a first quantity of the managed computing devices, the second threshold representative of a second quantity of the managed computing devices, the first quantity greater than the second quantity, invoking the sensor to obtain the data when the user interface obtains a first response indicative of the network corresponding to the managed network, and instructing the sensor to not obtain the data when the user interface obtains a second response indicative of the network corresponding to an unmanaged network.

Example 21 includes the method of example 15, wherein the threshold is a first threshold, and further including obtaining local device behavior data from the different computing devices on the network when the number of the managed computing devices satisfies a second threshold but does not satisfy the first threshold, the first threshold representative of a first quantity of the managed computing devices, the second threshold representative of a second quantity of the managed computing devices, the first quantity greater than the second quantity, anonymizing the local device behavior data to generate anonymized local device behavior data, and transmitting the anonymized local device behavior data to a server.

Example 22 includes an apparatus for dynamic network classification, the apparatus comprising means for determining whether a network to be connected by a computing device is a managed network based on network configuration information associated with the network, in response to determining the network is not a managed network, means for identifying a number of different computing devices on the network that are managed computing devices, and in response to determining that the number of the managed computing devices satisfies a threshold, means for invoking a sensor of the computing device to obtain data from computing devices associated with the network, the computing devices including the managed computing devices.

Example 23 includes the apparatus of example 22, wherein the means for determining is to compare the network configuration information to enterprise network configuration information, and in response to determining that the network is the managed network based on the comparison, invoke the sensor to obtain the data.

Example 24 includes the apparatus of example 22, wherein the means for determining is to compare the network configuration information to a whitelist of network configuration information, and in response to determining that the network is the managed network based on the comparison, invoke the sensor to obtain the data.

Example 25 includes the apparatus of example 22, wherein the means for determining is to compare the network configuration information to a blacklist of network configuration information, and in response to determining that the network is not the managed network based on the comparison, instruct the sensor not to obtain the data.

Example 26 includes the apparatus of example 22, wherein the threshold is a first threshold, and the means for identifying is to obtain a first encryption key, query the different computing devices on the network with a discovery packet based on the first encryption key, enumerate a first set of the different computing devices on the network that respond with a respective first response packet based on the first encryption key, enumerate a second set of the different computing devices on the network that do not respond to the discovery packet, enumerate a third set of the different computing devices on the network that respond with a respective second response packet based on a second encryption key that is different from the first encryption key, compare the number of the different computing devices in the first set to the first threshold and a second threshold, and determine a type of the data to be collected from the computing devices based on the comparisons.

Example 27 includes the apparatus of example 22, wherein the threshold is a first threshold, and the means for invoking is to launch a user interface on the computing device when a number of the managed computing devices satisfies a second threshold but does not satisfy the first threshold, the first threshold representative of a first quantity of the managed computing devices, the second threshold representative of a second quantity of the managed computing devices, the first quantity greater than the second quantity, invoke the sensor to obtain the data when the user interface obtains a first response indicative of the network corresponding to the managed network, and instruct the sensor to not obtain the data when the user interface obtains a second response indicative of the network corresponding to an unmanaged network.

Example 28 includes the apparatus of example 22, wherein the threshold is a first threshold, and the means for invoking is to instruct the sensor to obtain local device behavior data from the different computing devices on the network when the number of the managed computing devices satisfies a second threshold but does not satisfy the first threshold, the first threshold representative of a first quantity of the managed computing devices, the second threshold representative of a second quantity of the managed computing devices, the first quantity greater than the second quantity, instruct the sensor to anonymize the local device behavior data to generate anonymized local device behavior data, and instruct the sensor to transmit the anonymized local device behavior data to a server.

From the foregoing, it will be appreciated that example methods, apparatus, and articles of manufacture have been disclosed that allow for dynamic network classification using authenticated neighbor detection. The disclosed methods, apparatus, and articles of manufacture configure sensor(s) associated with a computing device communicatively coupled to a network to dynamically collect data from different computing devices associated with the network based on determining a managed state of the network. The disclosed methods, apparatus, and articles of manufacture improve the efficiency of using a computing device by allowing enterprise-managed devices and/or sensors to be able to classify a network of operation by classifying the local device(s) communicatively coupled with the network of operation. The disclosed methods, apparatus, and articles of manufacture are accordingly directed to one or more improvement(s) in the functioning of a computer.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus for dynamic network classification, the apparatus comprising:
 a network comparator to determine whether a network to be connected to by a computing device is a managed network based on network configuration information associated with the network;

a neighbor comparator to determine a number of different computing devices on the network that are managed computing devices in response to determining the network is not a managed network; and a sensor controller to invoke a sensor of the computing device to obtain data from computing devices associated with the network in response to determining that the number of the managed computing devices satisfies a threshold, the computing devices associated with the network including the managed computing devices.

2. The apparatus of claim 1, wherein the network comparator is to:

compare the network configuration information to enterprise network configuration information; and in response to determining that the network is the managed network based on the comparison, invoke the sensor to obtain the data.

3. The apparatus of claim 1, wherein the network comparator is to:

compare the network configuration information to a whitelist of network configuration information; and in response to determining that the network is the managed network based on the comparison, invoke the sensor to obtain the data.

4. The apparatus of claim 1, wherein the network comparator is to:

compare the network configuration information to a blacklist of network configuration information; and in response to determining that the network is not the managed network based on the comparison, instruct the sensor not to obtain the data.

5. The apparatus of claim 1, wherein the threshold is a first threshold, and the neighbor comparator is to:

obtain a first encryption key;

query the different computing devices on the network with a discovery packet based on the first encryption key;

enumerate a first set of the different computing devices on the network that respond with a respective first response packet based on the first encryption key;

enumerate a second set of the different computing devices on the network that do not respond to the discovery packet;

enumerate a third set of the different computing devices on the network that respond with a respective second response packet based on a second encryption key that is different from the first encryption key;

compare the number of the different computing devices in the first set to the first threshold and a second threshold; and determine a type of the data to be collected from the computing devices based on the comparisons.

6. The apparatus of claim 1, wherein the threshold is a first threshold, and the sensor controller is to:

launch a user interface on the computing device when a number of the managed computing devices satisfies a second threshold but does not satisfy the first threshold, the first threshold representative of a first quantity of the managed computing devices, the second threshold representative of a second quantity of the managed computing devices, the first quantity greater than the second quantity;

invoke the sensor to obtain the data when the user interface obtains a first response indicative of the network corresponding to the managed network; and instruct the sensor to not obtain the data when the user interface obtains a second response indicative of the network corresponding to an unmanaged network.

7. The apparatus of claim 1, wherein the threshold is a first threshold, and the sensor controller is to:

instruct the sensor to obtain local device behavior data from the different computing devices on the network when the number of the managed computing devices satisfies a second threshold but does not satisfy the first threshold, the first threshold representative of a first quantity of the managed computing devices, the second threshold representative of a second quantity of the managed computing devices, the first quantity greater than the second quantity;

instruct the sensor to anonymize the local device behavior data to generate anonymized local device behavior data; and instruct the sensor to transmit the anonymized local device behavior data to a server.

8. A non-transitory computer readable storage medium comprising instructions that, when executed, cause a computing device to at least:

determine whether a network to be connected to by the computing device is a managed network based on network configuration information associated with the network;

in response to determining the network is not a managed network, determine a number of different computing devices on the network that are managed computing devices; and in response to determining that the number of the managed computing devices satisfies a threshold, invoke a sensor of the computing device to obtain data from computing devices associated with the network, the computing devices associated with the network including the managed computing devices.

9. The non-transitory computer readable storage medium of claim 8, wherein the instructions, when executed, cause the computing device to:

compare the network configuration information to enterprise network configuration information; and in response to determining that the network is the managed network based on the comparison, invoke the sensor to obtain the data.

10. The non-transitory computer readable storage medium of claim 8, wherein the instructions, when executed, cause the computing device to:

compare the network configuration information to a whitelist of network configuration information; and in response to determining that the network is the managed network based on the comparison, invoke the sensor to obtain the data.

11. The non-transitory computer readable storage medium of claim 8, wherein the instructions, when executed, cause the computing device to:

compare the network configuration information to a blacklist of network configuration information; and in response to determining that the network is not the managed network based on the comparison, instruct the sensor not to obtain the data.

12. The non-transitory computer readable storage medium of claim 8, wherein the threshold is a first threshold, and the instructions, when executed, cause the computing device to:

obtain a first encryption key;

query the different computing devices on the network with a discovery packet based on the first encryption key;

enumerate a first set of the different computing devices on the network that respond with a respective first response packet based on the first encryption key;
enumerate a second set of the different computing devices on the network that do not respond to the discovery packet;
enumerate a third set of the different computing devices on the network that respond with a respective second response packet based on a second encryption key that is different from the first encryption key;
compare the number of the different computing devices in the first set to the first threshold and a second threshold; and
determine a type of the data to be collected from the computing devices based on the comparisons.

13. The non-transitory computer readable storage medium of claim 8, wherein the threshold is a first threshold, and the instructions, when executed, cause the computing device to:
launch a user interface on the computing device when a number of the managed computing devices satisfies a second threshold but does not satisfy the first threshold, the first threshold representative of a first quantity of the managed computing devices, the second threshold representative of a second quantity of the managed computing devices, the first quantity greater than the second quantity;
invoke the sensor to obtain the data when the user interface obtains a first response indicative of the network corresponding to the managed network; and
instruct the sensor to not obtain the data when the user interface obtains a second response indicative of the network corresponding to an unmanaged network.

14. The non-transitory computer readable storage medium of claim 8, wherein the threshold is a first threshold, and the instructions, when executed, cause the computing device to:
obtain local device behavior data from the different computing devices on the network when the number of the managed computing devices satisfies a second threshold but does not satisfy the first threshold, the first threshold representative of a first quantity of the managed computing devices, the second threshold representative of a second quantity of the managed computing devices, the first quantity greater than the second quantity;
anonymize the local device behavior data to generate anonymized local device behavior data; and
transmit the anonymized local device behavior data to a server.

15. A method for dynamic network classification, the method comprising:
determining whether a network to be connected to by a computing device is a managed network based on network configuration information associated with the network;
in response to determining the network is not a managed network, determine a number of different computing devices on the network that are managed computing devices; and
in response to determining that the number of the managed computing devices satisfies a threshold, invoking a sensor of the computing device to obtain data from computing devices associated with the network, the computing devices associated with the network including the managed computing devices.

16. The method of claim 15, further including:
comparing the network configuration information to enterprise network configuration information; and
in response to determining that the network is the managed network based on the comparison, invoking the sensor to obtain the data.

17. The method of claim 15, further including:
comparing the network configuration information to a whitelist of network configuration information; and
in response to determining that the network is the managed network based on the comparison, invoking the sensor to obtain the data.

18. The method of claim 15, further including:
comparing the network configuration information to a blacklist of network configuration information; and
in response to determining that the network is not the managed network based on the comparison, instructing the sensor not to obtain the data.

19. The method of claim 15, wherein the threshold is a first threshold, and further including:
obtaining a first encryption key;
querying the different computing devices on the network with a discovery packet based on the first encryption key;
enumerating a first set of the different computing devices on the network that respond with a respective first response packet based on the first encryption key;
enumerating a second set of the different computing devices on the network that do not respond to the discovery packet;
enumerating a third set of the different computing devices on the network that respond with a respective second response packet based on a second encryption key that is different from the first encryption key;
comparing the number of the different computing devices in the first set to the first threshold and a second threshold; and
determining a type of the data to be collected from the computing devices based on the comparisons.

20. The method of claim 15, wherein the threshold is a first threshold, and further including:
launching a user interface on the computing device when a number of the managed computing devices satisfies a second threshold but does not satisfy the first threshold, the first threshold representative of a first quantity of the managed computing devices, the second threshold representative of a second quantity of the managed computing devices, the first quantity greater than the second quantity;
invoking the sensor to obtain the data when the user interface obtains a first response indicative of the network corresponding to the managed network; and
instructing the sensor to not obtain the data when the user interface obtains a second response indicative of the network corresponding to an unmanaged network.

21. The method of claim 15, wherein the threshold is a first threshold, and further including:
obtaining local device behavior data from the different computing devices on the network when the number of the managed computing devices satisfies a second threshold but does not satisfy the first threshold, the first threshold representative of a first quantity of the managed computing devices, the second threshold representative of a second quantity of the managed computing devices, the first quantity greater than the second quantity;
anonymizing the local device behavior data to generate anonymized local device behavior data; and
transmitting the anonymized local device behavior data to a server.

22. An apparatus for dynamic network classification, the apparatus comprising:
 means for determining whether a network to be connected to by a computing device is a managed network based on network configuration information associated with the network;
 means for identifying a number of different computing devices on the network that are managed computing devices in response to determining the network is not a managed network; and
 means for invoking a sensor of the computing device to obtain data from computing devices associated with the network in response to determining that the number of the managed computing devices satisfies a threshold, the computing devices associated with the network including the managed computing devices.

23. The apparatus of claim 22, wherein the means for determining is to:
 compare the network configuration information to enterprise network configuration information; and
 in response to determining that the network is the managed network based on the comparison, invoke the sensor to obtain the data.

24. The apparatus of claim 22, wherein the means for determining is to:
 compare the network configuration information to a whitelist of network configuration information; and
 in response to determining that the network is the managed network based on the comparison, invoke the sensor to obtain the data.

25. The apparatus of claim 22, wherein the means for determining is to:
 compare the network configuration information to a blacklist of network configuration information; and
 in response to determining that the network is not the managed network based on the comparison, instruct the sensor not to obtain the data.

26. The apparatus of claim 22, wherein the threshold is a first threshold, and the means for identifying is to:
 obtain a first encryption key;
 query the different computing devices on the network with a discovery packet based on the first encryption key;
 enumerate a first set of the different computing devices on the network that respond with a respective first response packet based on the first encryption key;
 enumerate a second set of the different computing devices on the network that do not respond to the discovery packet;
 enumerate a third set of the different computing devices on the network that respond with a respective second response packet based on a second encryption key that is different from the first encryption key;
 compare the number of the different computing devices in the first set to the first threshold and a second threshold; and
 determine a type of the data to be collected from the computing devices based on the comparisons.

27. The apparatus of claim 22, wherein the threshold is a first threshold, and the means for invoking is to:
 launch a user interface on the computing device when a number of the managed computing devices satisfies a second threshold but does not satisfy the first threshold, the first threshold representative of a first quantity of the managed computing devices, the second threshold representative of a second quantity of the managed computing devices, the first quantity greater than the second quantity; and
 invoke the sensor to obtain the data when the user interface obtains a first response indicative of the network corresponding to the managed network.

28. The apparatus of claim 22, wherein the threshold is a first threshold, and the means for invoking is to:
 instruct the sensor to obtain local device behavior data from the different computing devices on the network when the number of the managed computing devices satisfies a second threshold but does not satisfy the first threshold, the first threshold representative of a first quantity of the managed computing devices, the second threshold representative of a second quantity of the managed computing devices, the first quantity greater than the second quantity;
 instruct the sensor to anonymize the local device behavior data to generate anonymized local device behavior data; and
 instruct the sensor to transmit the anonymized local device behavior data to a server.

29. An apparatus for dynamic network classification, the apparatus comprising:
 at least one memory; and
 at least one processor to execute instructions to at least:
  determine whether a network is a managed network based on network configuration information associated with the network, the network to be connected to a computing device;
  in response to determining the network is not a managed network, determine a number of different computing devices on the network that are managed computing devices; and
  in response to determining that the number of the managed computing devices satisfies a threshold, invoke a sensor of the computing device to obtain data from computing devices associated with the network, the computing devices associated with the network including the managed computing devices.

30. The apparatus of claim 29, wherein the at least one processor is to:
 compare the network configuration information to enterprise network configuration information; and
 in response to determining that the network is the managed network based on the comparison, invoke the sensor to obtain the data.

31. The apparatus of claim 29, wherein the at least one processor is to:
 compare the network configuration information to a whitelist of network configuration information; and
 in response to determining that the network is the managed network based on the comparison, invoke the sensor to obtain the data.

32. The apparatus of claim 29, wherein the at least one processor is to:
 compare the network configuration information to a blacklist of network configuration information; and
 in response to determining that the network is not the managed network based on the comparison, instruct the sensor not to obtain the data.

33. The apparatus of claim 29, wherein the threshold is a first threshold, and the at least one processor is to:
 obtain a first encryption key;
 query the different computing devices on the network with a discovery packet based on the first encryption key;

enumerate a first set of the different computing devices on the network that respond with a respective first response packet based on the first encryption key;

enumerate a second set of the different computing devices on the network that do not respond to the discovery packet;

enumerate a third set of the different computing devices on the network that respond with a respective second response packet based on a second encryption key that is different from the first encryption key;

compare the number of the different computing devices in the first set to the first threshold and a second threshold; and determine a type of the data to be collected from the computing devices based on the comparisons.

34. The apparatus of claim 29, wherein the threshold is a first threshold, and the at least one processor is to:

launch a user interface on the computing device when a number of the managed computing devices satisfies a second threshold but does not satisfy the first threshold, the first threshold representative of a first quantity of the managed computing devices, the second threshold representative of a second quantity of the managed computing devices, the first quantity greater than the second quantity; and invoke the sensor to obtain the data when the user interface obtains a first response indicative of the network corresponding to the managed network.

35. The apparatus of claim 29, wherein the threshold is a first threshold, and the at least one processor is to:

instruct the sensor to obtain local device behavior data from the different computing devices on the network when the number of the managed computing devices satisfies a second threshold but does not satisfy the first threshold, the first threshold representative of a first quantity of the managed computing devices, the second threshold representative of a second quantity of the managed computing devices, the first quantity greater than the second quantity;

instruct the sensor to anonymize the local device behavior data to generate anonymized local device behavior data; and instruct the sensor to transmit the anonymized local device behavior data to a server.

36. An apparatus comprising:

at least one memory; and at least one processor to execute instructions to at least:
generate an executable; and
transmit the executable to a computing device, the computing device to execute the executable to cause the computing device to:
determine whether a network is a managed network based on network configuration information associated with the network, the network to be connected to the computing device;
in response to determining the network is not a managed network, determine a number of different computing devices on the network that are managed computing devices; and
in response to determining that the number of the managed computing devices satisfies a threshold, invoke a sensor of the computing device to obtain data from computing devices associated with the network, the computing devices associated with the network including the managed computing devices.

37. The apparatus of claim 36, wherein the at least one processor is to generate the executable to cause the computing device to:

compare the network configuration information to enterprise network configuration information; and in response to determining that the network is the managed network based on the comparison, invoke the sensor to obtain the data.

38. The apparatus of claim 36, wherein the at least one processor is to generate the executable to cause the computing device to:

compare the network configuration information to a whitelist of network configuration information; and in response to determining that the network is the managed network based on the comparison, invoke the sensor to obtain the data.

39. The apparatus of claim 36, wherein the at least one processor is to generate the executable to cause the computing device to:

compare the network configuration information to a blacklist of network configuration information; and in response to determining that the network is not the managed network based on the comparison, instruct the sensor not to obtain the data.

40. The apparatus of claim 36, wherein the threshold is a first threshold, and the at least one processor is to generate the executable to cause the computing device to:

obtain a first encryption key;

query the different computing devices on the network with a discovery packet based on the first encryption key;

enumerate a first set of the different computing devices on the network that respond with a respective first response packet based on the first encryption key;

enumerate a second set of the different computing devices on the network that do not respond to the discovery packet;

enumerate a third set of the different computing devices on the network that respond with a respective second response packet based on a second encryption key that is different from the first encryption key;

compare the number of the different computing devices in the first set to the first threshold and a second threshold; and determine a type of the data to be collected from the computing devices based on the comparisons.

41. The apparatus of claim 36, wherein the threshold is a first threshold, and the at least one processor is to generate the executable to cause the computing device to:

launch a user interface on the computing device when a number of the managed computing devices satisfies a second threshold but does not satisfy the first threshold, the first threshold representative of a first quantity of the managed computing devices, the second threshold representative of a second quantity of the managed computing devices, the first quantity greater than the second quantity; and invoke the sensor to obtain the data when the user interface obtains a first response indicative of the network corresponding to the managed network.

42. The apparatus of claim 36, wherein the threshold is a first threshold, and the at least one processor is to generate the executable to cause the computing device to:

instruct the sensor to obtain local device behavior data from the different computing devices on the network when the number of the managed computing devices satisfies a second threshold but does not satisfy the first threshold, the first threshold representative of a first quantity of the managed computing devices, the second threshold representative of a second quantity of the managed computing devices, the first quantity greater than the second quantity;

instruct the sensor to anonymize the local device behavior data to generate anonymized local device behavior data; and instruct the sensor to transmit the anonymized local device behavior data to a server.

* * * * *